United States Patent
Takehara et al.

(10) Patent No.: US 6,464,398 B2
(45) Date of Patent: Oct. 15, 2002

(54) ROLLER BEARING

(75) Inventors: Tetsu Takehara; Hirohisa Mihara; Kiyohito Matsubayashi; Yuji Nakano, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/861,641

(22) Filed: May 22, 2001

(65) Prior Publication Data

US 2002/0051594 A1 May 2, 2002

(30) Foreign Application Priority Data

May 22, 2000 (JP) .................................. 2000-149784
Feb. 19, 2001 (JP) .................................. 2001-042163

(51) Int. Cl.⁷ ............................................. F16C 33/58
(52) U.S. Cl. ...................... 384/450; 384/564; 384/565
(58) Field of Search ................... 384/450, 564, 384/565, 569, 571

(56) References Cited

U.S. PATENT DOCUMENTS

| 4,916,751 A | 4/1990 | Sumita et al. ............... 384/516 |
| 5,890,815 A | 4/1999 | Ijuin et al. .................. 384/568 |

FOREIGN PATENT DOCUMENTS

| JP | 4-331813 | 11/1992 | ........... F16C/19/26 |
| JP | 6-63932 | 9/1994 | ........... F16C/33/78 |
| JP | 7-12133 | 1/1995 | ........... F16C/33/58 |
| JP | 7-8628 | 2/1995 | ........... F16C/19/36 |
| JP | 7-91452 | 4/1995 | ........... F16C/33/66 |
| JP | 7-103243 | 4/1995 | ........... F16C/33/66 |
| JP | 7-259864 | 10/1995 | ........... F16C/33/36 |
| JP | 2508178 | 4/1996 | ........... F16C/33/66 |
| JP | 8-135664 | 5/1996 | ........... F16C/33/66 |
| JP | 8-135666 | 5/1996 | ........... F16C/33/78 |
| JP | 9-32859 | 2/1997 | ........... F16C/33/66 |
| JP | 2538263 | 3/1997 | ........... F16C/33/78 |
| JP | 9-17774 | 7/1997 | ........... F16C/19/50 |
| JP | 9-196068 | 7/1997 | ........... F16C/33/58 |
| JP | 9-236131 | 9/1997 | ........... F16C/33/58 |
| JP | 9-287616 | 11/1997 | ........... F16C/19/22 |
| JP | 10-47360 | 2/1998 | ........... F16C/33/66 |
| JP | 10-110733 | 7/1998 | ........... F16C/33/66 |
| JP | 10-196660 | 7/1998 | ........... F16C/33/58 |
| JP | 2584623 | 8/1998 | ........... F16C/33/58 |
| JP | 11-132242 | 5/1999 | ........... F16C/33/62 |
| JP | 11-141557 | 5/1999 | ........... F16C/33/66 |

OTHER PUBLICATIONS

Brandlein et al.; "Die Walzlagerpraxis"; 1995.

*Primary Examiner*—Lenard A. Footland
(74) *Attorney, Agent, or Firm*—Sughrue Mion, PLLC

(57) ABSTRACT

An amount of undulation by which the inner surface 11 of a large-diameter-side flange portion 8 formed in an inner ring 5 is undulated is defined as an axial deflection δ. And, the composite roughness of a contact portion between the inner surface 11 and the head portion 10 of a tapered roller 6 is expressed as σ. A tapered roller bearing 1 is structured in such a manner that $\delta \leq 8$ μm and $\sigma \leq 0.22$ μmRMS, or, $\delta \leq 12$ μm and $\sigma \leq 0.18$ μ, or, $\delta \leq 16$ μm and $\sigma \leq 0.13$ μmRMS can be satisfied.

6 Claims, 13 Drawing Sheets

ROLLER BEARING

BACKGROUND OF THE INVENTION

The present invention relates to an improvement in a roller bearing which forms a drive device or an axle used in a railroad vehicle, a differential gear used in a car, or a rotary support part used in machinery. A roller bearing according to a first aspect of the invention can be applied to all of small- and medium-sized roller bearings having an inside diameter of the order of 20–200 mm. And, a roller bearing according to a second aspect of the invention can be applied to tapered roller bearings of all sizes. Especially, in a roller bearing according to the invention, when the quantity of lubricating oil existing in the rotary support part incorporating the present roller bearing therein is small, or when the lubricating oil has dried up in a short time, the present roller bearing can be prevented against seizure or scuffing; and, further, in case where a lubricating device is out of order, the present roller bearing can be prevented against quick seizure.

Conventionally, a roller bearing is assembled in a rotary support part disposed in various machines and, as a roller bearing for forming a rotary support part to which a large load is applied, there is used a roller bearing which employs a roller (for example, a cylindrical roller, a tapered roller, or a spherical roller) as a rolling body. FIGS. 1 to 3 show, as an example of such roller bearing, a tapered roller bearing 1 to be assembled into a rotary support part to which large radial load and axial load can be applied. This tapered roller bearing 1 is composed of an outer ring 3 having a conical-concave-surface-shaped outer ring raceway 2 formed on the inner peripheral surface thereof, an inner ring 5 having a conical-convex-surface-shaped inner ring raceway 4 formed on the outer peripheral surface thereof, and a plurality of tapered rollers 6, 6 slidably interposed between the outer ring raceway 2 and inner ring raceway 4. Also, each of the tapered rollers 6, 6 has an outer peripheral surface formed as a conical-convex-surface-shaped rolling surface 7 which can be contacted with the outer ring raceway 2 and inner ring raceway 4. Further, of the outer peripheral surface two end portions of the inner ring 5, in the large-diameter-side end portion, there is formed a large-diameter-side flange portion 8 and, in the small-diameter-side end portion, there is formed a small-diameter-side flange by portion 9.

When the above-structured tapered roller bearing 1 is in operation, the tapered rollers 6, 6, as shown in FIG. 2, each rotate about their own axes as well as rotate along the outer ring raceway 2 and inner ring raceway 4 in such a manner that they are present nearer to the large-diameter sides of the outer ring raceway 2 and inner ring raceway 4, thereby allowing the outer ring 3 and inner ring 5 to rotate with respect to each other. When the above-structured tapered roller bearing 1 is in operation, the head portions 10 of the tapered rollers 6, that is, the large-diameter-side end faces of the tapered rollers 6 and the inner surface 11 of the large-diameter-side flange portion 8, as can be seen clearly from the Hertz' elastic contact theory, are contacted with each other in such a contact ellipse 12 portion as shown by oblique lattices in FIG. 3. Since the contact state between the head portion 10 and inner surface 11 is a rolling contact with slippage, this is a severe condition from the viewpoint of friction control. Therefore, in case where the quantity of lubricating oil supplied to the tapered roller bearing 1 is excessively small or dries up, in a terrible case, there is a possibility that there can occur damage such as seizure in the tapered roller bearing 1. By the way, damage such as seizure can occur in various portions of various roller bearings including the tapered roller bearing 1 and, of these portions, the portion where the condition is the severest and damage is easy to occur is the contact portion between the head portion 10 of the tapered roller 6 and the inner surface 11 of the large-diameter-side flange portion 8. The present invention aims at preventing the contact portion from being damaged. Accordingly, the term "seizure" used in the present specification means seizure in the contact portion between the head portion 10 and inner surface 11.

In order to prevent the above seizure from occurring, there are conventionally known the following techniques (1)–(7). That is:

(1) As, disclosed in JP-A-7-91452, JP-A-7-103243 and JP-A-10-110733 as well as in the Japanese Patent No. 2508178, the head portion of the tapered roller and the inner surface of the large-diameter-side flange portion are enhanced in roughness or are plateau worked into shapes in which the lubricating oil can be retained easily.

(2) Extreme-pressure additive for enhancing seizure resistance and wear resistance is added to the lubricating oil.

(3) As disclosed in JP-A-9-177774, JP-A-9-287616, JP-A-11-132242 and JP-A-7-8628U, on the head portion of the tapered roller and the inner surface of the large-diameter-side flange portion, there are formed chemically reformed films or ceramic films.

(4) As disclosed in JPA-7-259864, JP-A-8-135664, JP-A-8-135666, JP-A-9-32859, JP-A-10-47360, and JPA-11-141557, in the interior portion of the roller bearing or in the peripheral portion of the roller bearing, there is disposed an oil basin for storing lubricating oil temporarily or a reservoir for storing grease; and, when the lubricating condition is worsened, the lubricating oil or grease is supplied from the oil basin or reservoir to thereby prevent the roller bearing from seizing.

(5) As disclosed in JP-A-4-331813, JP-A-7-12133 and JP-A-10-196660 as well as in the registered utility model No. 2584623, the edge of the connecting portion between the end face and chamfered portion of the roller is rounded, whereby, even in case where the roller is skewed and the contact ellipse is in part pressed out into the chamfered portion, an edge load occurring in the contact portion can be relieved.

(6) As disclosed in JP-A-6-63932U and in the registered utility model No. 2538263, the roller bearing is formed as a sealed structure, whereby a lubricant charged once into the interior portion of the roller bearing can be prevented from flowing out therefrom.

(7) As disclosed in JP-A-9-196068 and JP-A-9-236131, by modifying the shape of the end portion of the roller, the contact point height between the end face of the roller and inner surface of the flange portion (the diameter-direction distance from the rolling surface of the roller) is made zero, thereby preventing slippage at the contact point thereof.

Of the conventional seizure preventive techniques respectively described in the above-mentioned articles (1) to (7), the five techniques (1), (3), (4), (6) and (7) respectively relate to a specially specified roller bearing but cannot be applied to an ordinary roller bearing, or, even in case where they can be applied to the ordinary roller bearing, most of them increase the cost of production. Some of the techniques shown in the article (3) can produce the roller bearing at a relatively low cost but the durability and recycling capacity of a film obtained by these techniques are not satisfactory;

that is, the film can provide moderate initial performance but, due to its change with the passage of time (such as deterioration or wear), the film fails to provide its expected performance.

Also, of the remaining techniques set forth in the articles (2) and (5), the technique in the article (2) is a measure obtained by changing the property of the lubricant; that is, it has a certain degree of effect but is not an improvement in the roller bearing itself. Therefore, in order to attain seizure prevention of a higher order, it is desired that the present technique should be used in combination with an improvement in the roller bearing itself.

Further, the technique set forth in the article (5) can provide a high seizure preventive effect but increases the production cost of the roller bearing. Therefore, in order to spread its usable range, it is desired to realize a new technique which can provide a similar seizure preventive effect at a lower cost.

SUMMARY OF THE INVENTION

The present invention aims at eliminating the drawbacks found in the above-mentioned conventional techniques. Accordingly, it is an object of the invention to provide an improved roller bearing which has sufficient seizure resistance by optimizing the internal dimensions thereof without adding specific treatments, specific shapes, or specific functions thereto.

Of the roller bearings according to the invention, the roller bearing according to a first aspect of the invention, similarly to the above-mentioned roller bearings (including a cylindrical roller bearing, a needle bearing, a tapered roller bearing, and a self-aligning roller bearing), comprises an outer ring having an outer ring raceway formed on the inner peripheral surface thereof an inner ring having an inner ring raceway formed on the outer peripheral surface thereof, and a plurality of rollers each having an outer peripheral surface serving as a rolling surface contactable with the outer ring raceway and inner ring raceway and also an axial-direction end face serving as a sliding contact surface slidingly contactable with the inner surface of a flange portion formed on at least one of the end portion inner peripheral surface of the outer ring and the end portion outer peripheral surface of the inner ring.

Especially, in the roller bearing according to the first aspect of the invention, where an axial-direction difference between the top and bottom portions of the circumferential-direction undulation of the inner surface of the flange portion is defined as axial deflection $\delta$, a composite roughness $(\sigma_1^2+\sigma_2^2)^{1/2}$ consisting of the root-mean-square roughness $\sigma_1$ of the sliding contact surface and the root-mean-square roughness $\sigma_2$ of the inner surface of the flange portion is defined as a flange/roller composite roughness $\sigma$, the flange/roller composite roughness $\sigma$ and axial deflection $\delta$ can satisfy at least one of the following conditions (1), (2) and (3):

$\delta \leq 8$ μm and $\sigma \leq 0.22$ μmRMS; (1)

$\delta \leq 12$ μm and $\sigma \leq 0.18$ μmRMS; (2)

$\delta \leq 16$ μm and $\sigma \leq 0.13$ μmRMS. (3)

Preferably, the flange/roller composite roughness $\sigma$ and axial deflection $\delta$ may satisfy a condition (4), $\delta \leq 8$ μm and $\sigma \leq 0.16$ μmRMS. (4)

More preferably, the flange/roller composite roughness $\sigma$ and said axial deflection $\delta$ may satisfy a condition (5), $\delta \leq 4$ μm and $\sigma \leq 0.16$ μmRMS. (5)

On the other hand, the roller bearing according to a second aspect of the invention, similarly to the above-mentioned conventional roller bearing (tapered roller bearing), comprises an outer ring having a conical-concave-surface-shaped outer ring raceway formed on the inner peripheral surface thereof, an inner ring having a conical-convex-surface-shaped inner ring raceway formed on the outer peripheral surface thereof, and a plurality of tapered rollers each having an outer peripheral surface serving as a conical-convex-surface-shaped rolling surface contactable with the outer ring raceway and inner ring raceway and also an axial-direction end face serving as a sliding contact surface slidingly contacted with the inner surface of a flange portion formed on at least one of the end portion inner peripheral surface of the outer ring and the end portion outer peripheral surface of the inner ring.

Especially, in the tapered roller bearing according to the second aspect of the invention, where an axial-direction difference between the top and bottom portions of the circumferential-direction undulation of the inner surface of the flange portion is defined as axial deflection $\delta$, a composite roughness $(\sigma_1^2+\sigma_2^2)^{1/2}$ consisting of the root-mean-square roughness $\sigma_1$ of the sliding contact surface and the root-mean-square roughness $\sigma_2$ of the inner surface of the flange portion is defined as a flange/roller composite roughness $\sigma$, dm using mm as the unit thereof expresses the pitch circle diameter of the tapered roller bearing, $\beta$ expresses 1/2 of the cone angle of each of the tapered rollers, L using mm as its unit expresses the axial-direction length of each of the tapered rollers, and $\theta f$ expresses the flange angle, that is, the inclination angle of the inner surface of the flange portion with respect to a virtual plane crossing at right angles to the center axes of the outer and inner rings, the flange/roller composite roughness $\sigma$ and axial deflection $\delta$ can satisfy at least one of the following conditions (a), (b) and (c):

$$\delta \leq \left\{0.21 \cdot \left(\frac{dm}{\tan(2\beta) \cdot L}\right) + 0.96\right\} \Big/ \cos\theta f, \text{ and} \quad (a)$$

$\sigma \leq 0.22 \times (3 \times 10^{-6} \text{ dm}^2 + 0.0044 \text{ dm} + 0.53)$ μmRMS;

$$\delta \leq \left\{0.36 \cdot \left(\frac{dm}{\tan(2\beta) \cdot L}\right) + 1.28\right\} \Big/ \cos\theta f, \text{ and} \quad (b)$$

$\sigma \leq 0.18 \times (3 \times 10^{-6} \text{ dm}^2 + 0.0044 \text{ dm} + 0.53)$ μmRMS;

$$\delta \leq \left\{0.51 \cdot \left(\frac{dm}{\tan(2\beta) \cdot L}\right) + 1.68\right\} \Big/ \cos\theta f, \text{ and} \quad (c)$$

$\sigma \leq 0.13 \times (3 \times 10^{-6} \text{ dm}^2 + 0.0044 \text{ dm} + 0.53)$ μmRMS.

Preferably, the flange/roller composite roughness $\sigma$ and axial deflection $\delta$ may satisfy the following condition (d).

$$\delta \leq \left\{0.21 \cdot \left(\frac{dm}{\tan(2\beta) \cdot L}\right) + 0.96\right\} \Big/ \cos\theta f, \text{ and} \quad (d)$$

$\sigma \leq 0.16 \times (3 \times 10^{-6} \text{ dm}^2 + 0.0044 \text{ dm} + 0.53)$ μmRMS.

More preferably, the flange/roller composite roughness $\sigma$ and axial deflection $\delta$ may satisfy the following condition (e).

$$\delta \leq \left\{0.072 \cdot \left(\frac{dm}{\tan(2\beta) \cdot L}\right) + 0.18\right\} \Big/ \cos\theta f, \text{ and} \quad (e)$$

$$\sigma \leq 0.16 \times (3 \times 10^{-6} \ dm^2 + 0.0044 \ dm + 0.53) \mu mRMS.$$

Next, of the above conditions for specifying the respective aspects of the invention, the concept of the axial deflection δ will be described below with reference to FIGS. 4 and 5. By the way, the following description will be given with respect to a tapered roller bearing in which the effects of the invention can be obtained most clearly. The first aspect of the invention is not limited to a tapered roller bearing but can be applied to all kinds of roller bearings, provided that they include a flange portion in one of outer ring and inner ring raceways; that is, the first aspect can be applied to a cylindrical roller bearing (including a needle bearing) and a self-aligning roller bearing as well. On the other hand, the second aspect of the invention can be applied to a tapered roller bearing only.

The inner surface 11 of the large-diameter-side flange portion 8 formed on the large-diameter-side end portion of the outer peripheral surface of the inner ring forming such a tapered roller bearing as shown in the above-mentioned FIGS. 1 and 2 is formed as a partially conical-concave-surface-shaped surface. When working such inner surface 11, the center Xα of the partially conical-concave-surface-shaped surface and the center Xβ of the inner ring 5 are to be matched to each other. However, in some cases, the inner surface 11 is worked in such a manner that the two centers, as shown exaggeratedly in FIG. 5, are shifted from each other by an amount equivalent to a reference mark x shown in FIG. 5 due to their inevitable manufacturing errors. In case where the center Xα of the inner surface 11 and the center Xβ of the inner ring 5 are not matched to each other, the inner surface 11 is undulated in shape in the circumferential direction thereof. In other words, the axial-direction (in FIG. 5, right-and-left direction) positions of the contact portion of the inner surface 11 with the head portion 10 of the tapered roller 6 are not constant in the circumferential direction thereof, so that the top and bottom portions of the undulation are shifted from each other by a difference δ shown in FIG. 5. This difference δ is defined as the above-mentioned axial deflection. By the way, such axial deflection δ can occur not only when, as shown in FIG. 5, the two centers Xα and Xβ are shifted from each other while they are parallel, but also when the two centers Xα and Xβ are not parallel, or when there are originally found undulations in the inner surface 11. In any case, a difference between the axial-direction positions of the top and bottom portions of the contact portion of the inner surface 11 with the head portion 10 of the tapered roller 6 provides the axial deflection δ.

By the way, the measurement of the axial deflection δ is carried out in the following manner. That is, firstly, the inner ring 5 is placed on the upper surface of a turntable of a roundness measuring device with the large-diameter-side flange portion 8 located in the bottom. And, the inner ring raceway 4 is centered so that a shift distance between the rotation center of the turntable and the center of the inner ring 5 becomes smallest. In this state, a probe of the roundness measuring device is contacted with the contact portion of the inner surface 11 of the large-diameter-side flange portion 8 with the head portion 10 of the tapered roller 6, and the turntable is rotated, thereby measuring the undulation of the inner surface 11. And, a difference between the largest and smallest ones of the measured values is defined as the axial deflection δ.

In the case of the above-structured roller bearing according to the invention, not only an increase in the manufacturing cost thereof can be minimized but also, even when it operates under the poor lubricating condition, damage such as scuffing or seizure is hard to occur. That is, as the axial deflection δ and the composite roughness σ relating to the sliding contact surface of the roller and the inner surface of the flange portion respectively decrease in value, the above-mentioned damage can be prevented more effectively. However, in case where enhancement in the damage preventive effect is to be expected by controlling selectively only one of the axial deflection δ and the composite roughness σ, down to a low value, high working accuracy must be realized in the selected one of the axial deflection δ and the composite roughness σ, which increases the manufacturing cost of the roller bearing. On the other hand, since every one of roller bearings according to the invention can enhance the damage preventive effect due to the synergistic effect of the axial deflection δ and the composite roughness σ, the working accuracy of each of the axial deflection δ and the composite roughness σ need not be set high. Thanks to this, as described above, while controlling an increase in the manufacturing cost, the damage preventive effect can be enhanced.

Next, description will be given below of the reason why the damage preventive effect can be obtained by controlling both of the axial deflection δ and the composite roughness σ down to small values.

That is, firstly, to control the axial deflection δ down to a small value is effective in that it can lower the maximum value of variations in the contact surface pressures of the respective contact portions between the inner surface 11 of the large-diameter-side flange portion 8 and the head portions 10 of the respective tapered rollers 6. In other words, in the case of an ideal inner ring 5 in which the above axial deflection δ is not present all (δ=0), the contact portions between the head portions 10 of the plurality of tapered rollers 6 and the inner surface 11 of the large-diameter-side flange portion 8 support equally the axial load applied into between the outer ring 3 and inner ring 5. Therefore, the contact surface pressures cannot be excessively large in any of the contact portions. Here, the seizure resistance can be enhanced as the product of the contact surface pressure P of the contact portion and the sliding speed V. Thus, as the PV value and calorific value become smaller, the seizure resistance enhances. Accordingly, by minimizing the maximum value of the variations in the contact surface pressures in the above-mentioned manner, the seizure resistance can be enhanced. On the other hand, in case where the axial deflection δ is large, that is, a large undulation is present on the inner surface 11, the contact portions between the head portions 10 of the plurality of tapered rollers 6 and the inner surface 11 of the large-diameter-side flange portion 8 do not support equally the axial load applied into between the outer ring 3 and inner ring 5, but the contact surface pressure on the top portion of this large undulation becomes higher than the contact surface pressure on the bottom portion thereof. Due to this, the PV values become higher locally and thus the calorific values become larger, with the result that seizure is easy to occur in these portions and the seizure resistance of the bearing is thereby lowered.

Also, referring to the composite roughness σ, in case where a proper oil film is formed in the contact portion between the inner surface 11 of the large-diameter-side flange portion 8 and the head portion 10 of the tapered roller 6, metals can be prevented against direct contact with each other in the contact portion to thereby prevent occurrence of so called metal contact; that is, to control the composite roughness σ down to a low value is effective in that the metal contact can be prevented. For example, in case where the value of the composite roughness σ is large, that is, in case where the surface roughness of the inner surface 11 and/or head portion 10 is large (rough), the top portions of minute undulations existing on the surface of one metal are easy to touch the surface of the other metal directly not through the oil film. In this state, friction acting on the contact portion becomes large, which lowers the seizure resistance of the bearing.

As described above, in all of the roller bearings according to the invention, since the seizure resistance thereof is enhanced by controlling the axial deflection δ and composite roughness σ down to small values, even in case where the quantity of the lubricating oil to be taken into the contact portion between the inner surface 11 and head portion 10 is small, damage such as scuffing or seizure can be prevented. Also, because a sufficient seizure resisting property can be obtained even without reducing the respective values of the axial deflection δ and composite roughness σ down to extremely small values, it is possible to minimize an increase in the manufacturing cost of the roller bearing which is caused by enhancing the seizure resisting property of the roller bearing.

DETAILED DESCRIPTION OF THE PREFERRED EMBODIMENTS

Figure 1:
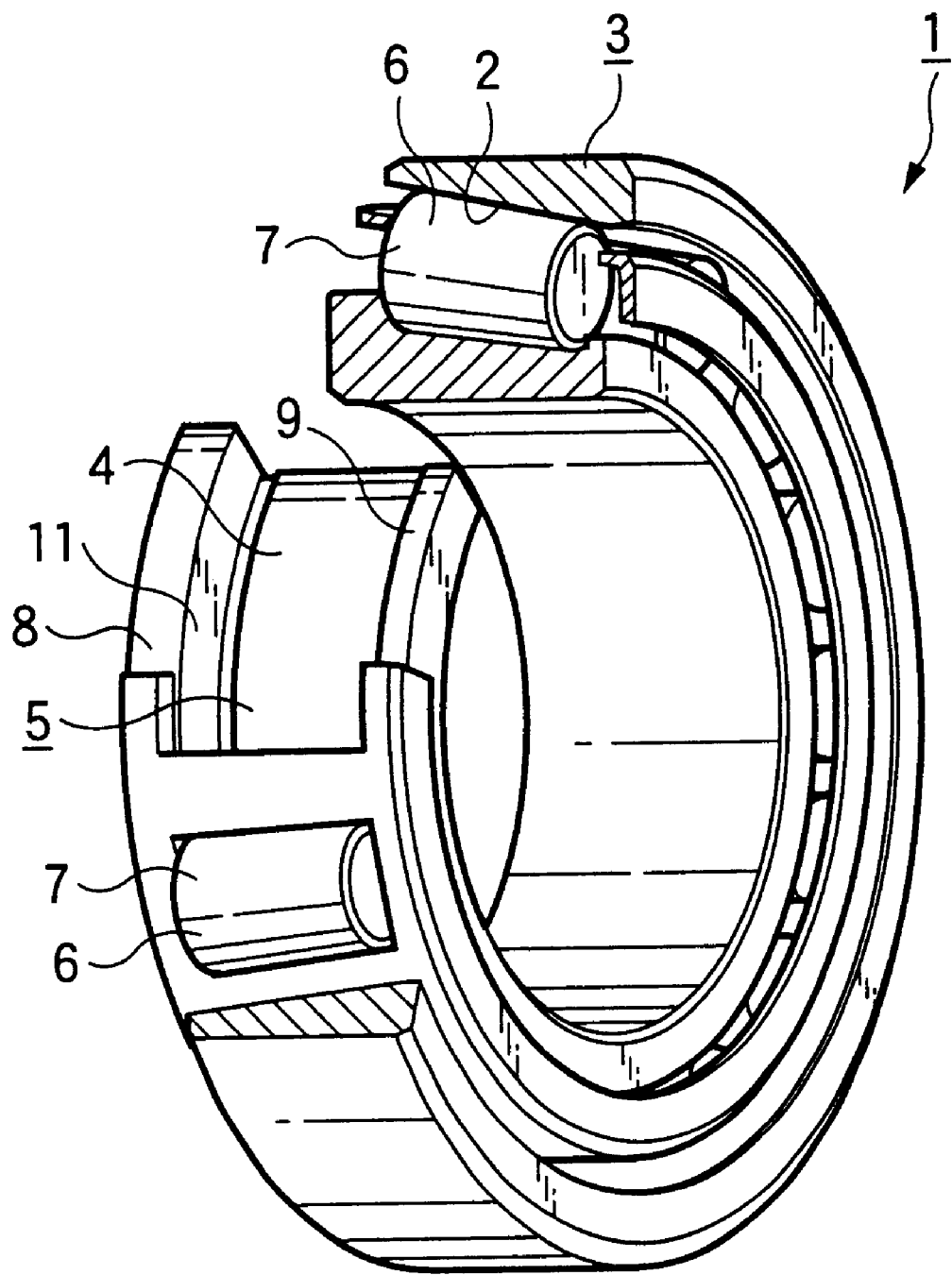
FIG. 1 is a partially cut perspective view of a tapered roller bearing to which the invention applies.
Figure 6:
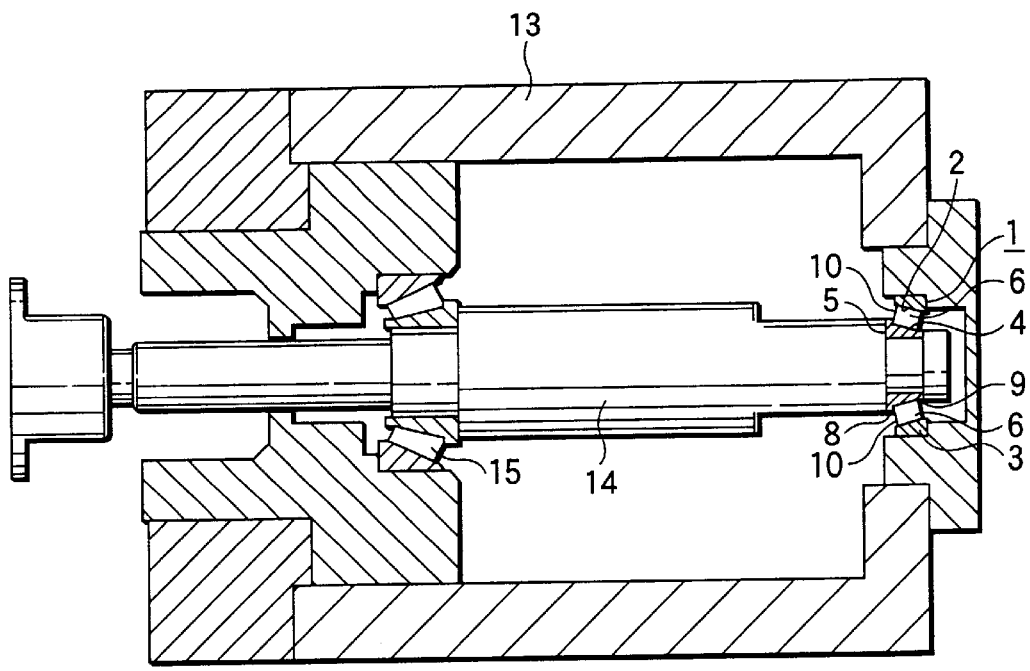
FIG. 6 is a section view of a test apparatus used in a test conducted for confirmation of the effects of the invention.

With respect to a test conducted in order to confirm the effects of the present invention, firstly, description will be given below of a test conducted on an embodiment of a roller bearing according to a first aspect of the invention. This test was conducted by such a test apparatus as shown in FIG. 6, using the tapered roller bearing 1 shown in FIGS. 1 to 3 which has an inside diameter of 70 mm and an outside diameter of 150 mm. In the test apparatus, in a state that a rotary shaft 14 is rotatably supported inwardly of a housing 13 by the tapered roller bearing 1 used as a test sample and another support bearing 15, the rotary shaft 14 can be rotationally driven by a drive motor (not shown). And, using such test apparatus, a test for evaluation of the seizure resistance of the respective tapered roller bearings 1 was conducted while causing the axial deflection δ and composite roughness σ to vary variously. The test conditions were as follows:

Rotation speed: 6,000 min$^{-1}$

Thrust load: 11,000 N

Oil supply quantity prior to stop of oil supply: 1 liter/min.

Lubricating oil: Gear oil {1.8×10$^{-4}$ m$^2$/s (180 cSt)/40° C.}

PV value of contact portion: 600 (MPa·m/s)

The axial deflection δ and composite roughness σ of the respective tapered roller bearings 1, which were used in the test conducted under these conditions, are shown in the next table. Also, the results of the test on the seizure resistance of the respective tapered roller bearings 1 are shown in the next table 1 and in FIGS. 7 to 9.

TABLE 1

| Bearing No. | Seizure Time [sec] | Axial Deflection δ [μm] | Composite Roughness σ [μmRMS] | Evaluation |
|---|---|---|---|---|
| 1 | 171 | 3.8 | 0.121 | ⊚ |
| 2 | 72 | 3.2 | 0.131 | ○ |
| 3 | 24 | 9.9 | 0.186 | X |
| 4 | 22 | 7.6 | 0.237 | X |
| 5 | 16 | 16.7 | 0.206 | X |
| 6 | 39 | 12.0 | 0.165 | X |
| 7 | 220 | 7.4 | 0.169 | ⊚ |
| 8 | 28 | 13.8 | 0.146 | X |
| 9 | 79 | 11.2 | 0.121 | ○ |
| 10 | 151 | 9.8 | 0.175 | ⊚ |
| 11 | 174 | 2.8 | 0.152 | ⊚ |
| 12 | 250 | 3.0 | 0.146 | ⊚ |
| 13 | 92 | 3.3 | 0.169 | ○ |
| 14 | 65 | 3.8 | 0.160 | ○ |
| 15 | 22 | 3.3 | 0.226 | X |
| 16 | 61 | 8.9 | 0.142 | ○ |
| 17 | 68 | 8.3 | 0.132 | ○ |
| 18 | 71 | 5.8 | 0.124 | ○ |
| 19 | 212 | 3.6 | 0.130 | ⊚ |
| 20 | 130 | 4.0 | 0.135 | ⊚ |
| 21 | 30 | 13.0 | 0.143 | X |

TABLE 1-continued

| Bearing No. | Seizure Time [sec] | Axial Deflection δ [μm] | Composite Roughness σ [μmRMS] | Evaluation |
| --- | --- | --- | --- | --- |
| 22 | 39 | 12.2 | 0.167 | X |
| 23 | 23 | 8.2 | 0.275 | X |
| 24 | 40 | 6.5 | 0.253 | X |
| 25 | 60 | 6.3 | 0.151 | ○ |
| 26 | 63 | 3.5 | 0.161 | ○ |
| 27 | 76 | 11.1 | 0.174 | ○ |
| 28 | 85 | 12.0 | 0.143 | ○ |
| 29 | 90 | 15.6 | 0.124 | ○ |
| 30 | 71 | 12.6 | 0.117 | ○ |
| 31 | 35 | 13.0 | 0.169 | X |
| 32 | 30 | 15.2 | 0.163 | X |
| 33 | 23 | 15.1 | 0.160 | X |
| 34 | 250 | 7.4 | 0.152 | ◉ |
| 35 | 30 | 7.3 | 0.238 | X |
| 36 | 75 | 2.7 | 0.215 | ○ |
| 37 | 65 | 4.8 | 0.190 | ○ |
| 38 | 69 | 8.1 | 0.217 | ○ |

In Table 1, referring to the time to cause seizure (seizure time) showing the seizure resistance. when the tapered roller bearing 1 was operated under the above-mentioned operating conditions while supplying the lubricating oil to the tapered roller bearing 1, in case where supply of the lubricating oil to the tapered roller bearing 1 was stopped, there occurred seizure in the inner ring 5 of the tapered roller bearing 1; that is, the seizure time is expressed by the time of occurence of seizure in the inner ring 5 after stop of the lubricating oil. By the way, the occurrence of the seizure in the inner ring 5 was confirmed by detecting the fact that torque necessary to rotate the inner ring 5 rose suddenly.

Figure 7:
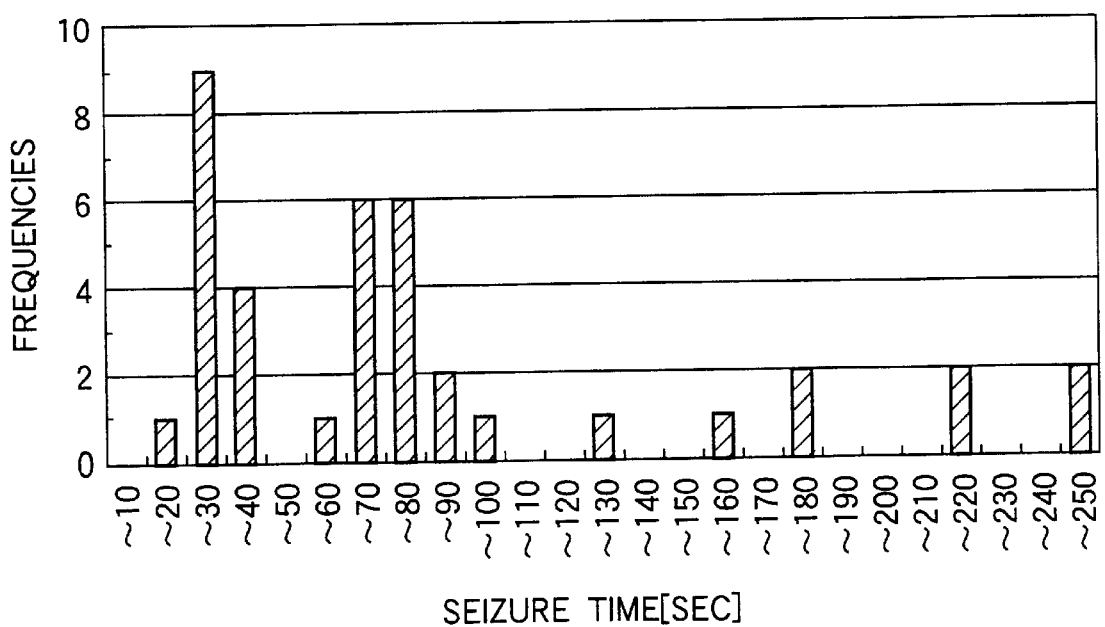
FIG. 7 is a bar graph of the distribution state of the results of the above test.
Figure 8:
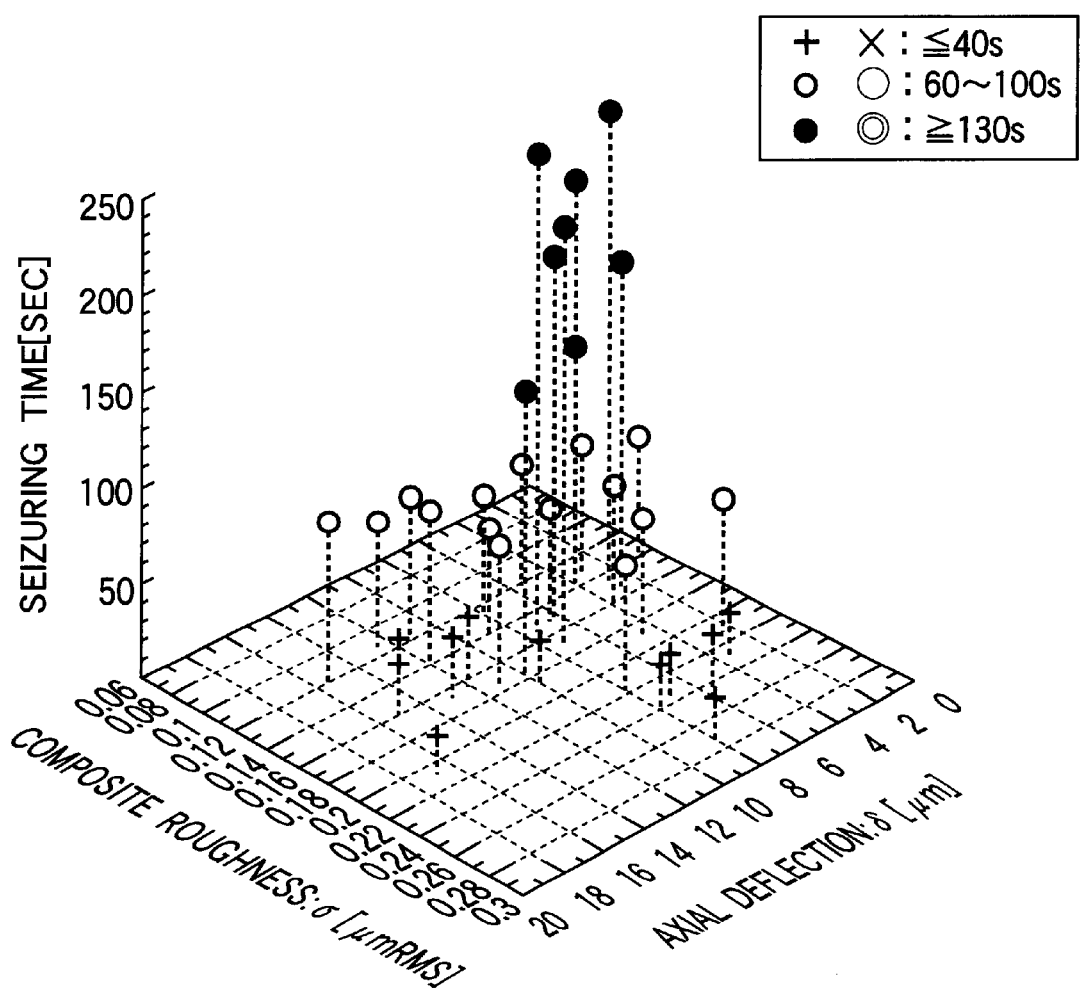
FIG. 8 is a three-dimensional graph of the test results.

Now, referring to reference marks which are used in the evaluation items of Table 1 to show the results of the test conducted in the above-mentioned manner, [x] expresses the bearing that required the seizure time of 40 sec. or shorter, [○] expresses one requiring the seizure time in the range of 60–100 sec., and [◉] expresses one requiring the seizure time of 130 sec. or longer, respectively. This classification of the test results into these three groups was made after the test results were adjusted into a graph which represents the distribution of the test results as shown in FIG. 7. As can be clearly understood, the seizure resistance is divided into the above-mentioned three groups, that is, [x], [○] and [◉]. Also, FIG. 8 is a three-dimensional graph which shows the relations between the axial deflection δ, composite roughness σ, and seizure time respectively shown in Table 1. Further, FIG. 9 shows the results of FIG. 8 in the form of a plane graph in order to define the area in which the seizure resistance is enhanced.

Figure 9:
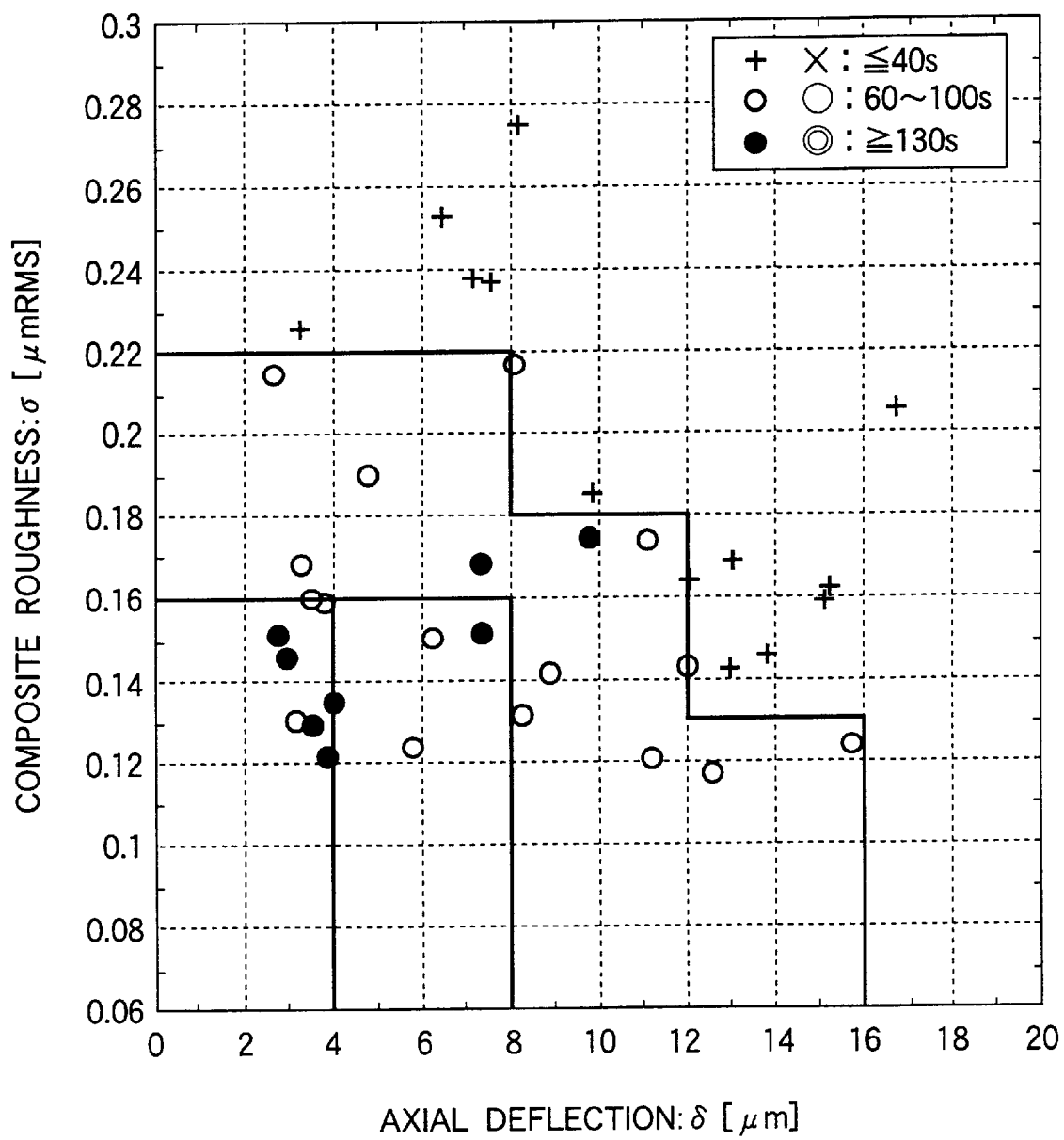
FIG. 9 is a plane graph of the test results.

From Table 1 as well as FIGS. 8 and 9 representing the results of the test conducted on the seizure resistance of the bearings under the above-mentioned conditions, there can be found the following facts. That is, firstly, from the three-dimensional graph of FIG. 8, cases having high seizure resistance (mark [○]) or cases having extremely high seizure resistance (mark [◉]) are found collectively in the test samples where the axial deflection δ and composite roughness σ are small. On the other hand, cases having low seizure resistance (mark [x]) are found in the test samples where the axial deflection δ and composite roughness σ are large.

Next, when FIG. 9 representing an orthogonal coordinates plane using the above-mentioned axial deflection δ and composite roughness σ is checked from the viewpoint of enhancement in the seizure resistance, the present orthogonal coordinates plane can be divided into the following five kinds of areas (1)–(5). That is, $$\delta \leq 8 \, \mu m, \text{ and, } \sigma \leq 0.22 \, \mu mRMS \tag{1}$$

This area is an area in which the axial deflection δ is set relatively small and, in this area, even in case where the composite roughness σ is relatively large, the seizure resistance can be enhanced (mark [○] or higher).

$$\delta \leq 12 \, \mu m, \text{ and, } \sigma \leq 0.18 \, \mu mRMS \tag{2}$$

This area is an area in which the axial deflection δ is set small to a certain degree and, in this area, even in case where the composite roughness σ is relatively large, the seizure resistance can be enhanced (mark [○] or higher).

$$\delta \leq 16 \, \mu m, \text{ and, } \sigma \leq 0.13 \, \mu mRMS \tag{3}$$

This area is an area in which the composite roughness σ is set small to a certain degree and, in this area, even in case where the axial deflection δ is large to a certain degree, the seizure resistance can be enhanced (mark [○] or higher).

$$\delta \leq 8 \, \mu m, \text{ and, } \sigma \leq 0.16 \, \mu mRMS \tag{4}$$

This area is an area in which the composite roughness σ is set smaller and, in this area, the appearance percentage of the extremely high seizure resistance (mark [◉]) is high.

$$\delta \leq 4 \, \mu m, \text{ and, } \sigma \leq 0.16 \, \mu mRMS \tag{5}$$

This area is an area in which the composite roughness σ is set further smaller and, in this area, the appearance percentage of the extremely high seizure resistance (mark [◉]) is higher.

From the above facts, the area to be able to enhance the seizure resistance may satisfy at least one of the above conditions (1), (2) and (3). Preferably, the above condition (4) may be selected and, more preferably, the above condition (5) may be selected.

The foregoing description has been made with respect to the tapered roller bearing. However, the first aspect of the invention can also be applied to all roller bearings that include a flange portion (for example, a cylindrical roller bearing, a needle bearing, and a self-aligning roller bearing). Also, the invention is not limited to roller bearings used in the railroad vehicle and car, but it can be applied to roller bearings used in all kinds of machines. For the size of the bearing as well, it can be duly estimated that the invention is effective in bearings of a small size and bearings of a medium size and also in bearings of a size larger than these small and medium sizes.

Next, description will be given below of the results of an investigation conducted on a roller bearing according to a second embodiment of the invention during a process for completing the present roller bearing with reference to FIGS. 10 to 15. By the way, it is true that the first aspect of the invention can be applied to all roller bearings, but the bearings to which the first aspect of the invention can provide sufficient effects are small- and medium-sized bearings having an inside diameter in the range of 20–200 mm. On the other hand, bearings to which the second aspect of the invention can provide effects are limited to tapered roller bearings, while the effects of the second aspect of the invention can be obtained regardless of the sizes of the tapered roller bearings.

Figure 2:
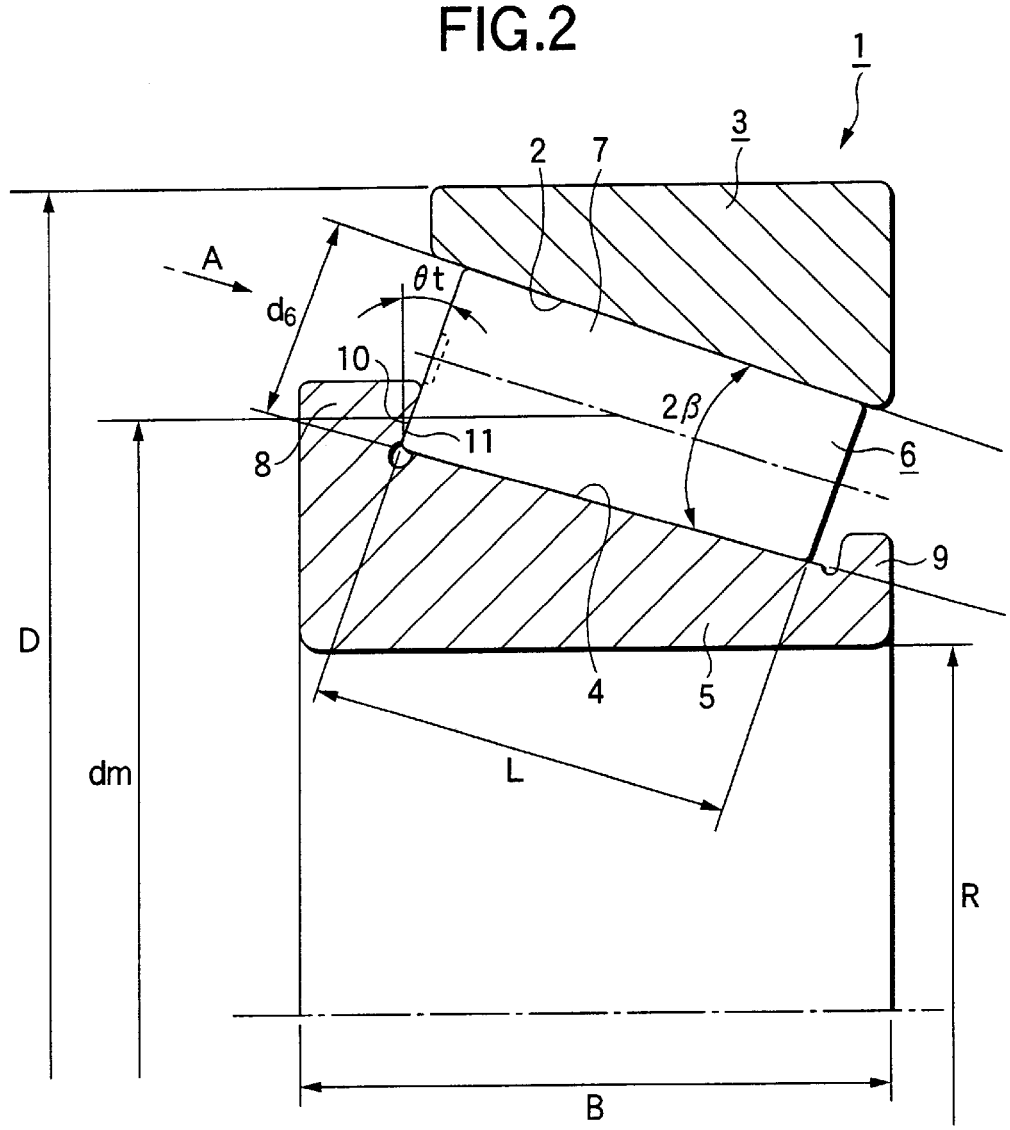
FIG. 2 is a partially cut section view of the tapered roller bearing.
Figure 3:
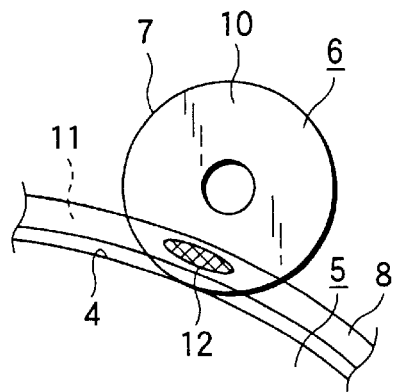
FIG. 3 is a partially perspective view of the tapered roller bearing taken along the arrow mark A shown in FIG. 2, showing a state of contact between the end face of a tapered roller and the inner surface of a flange portion.
Figure 4:
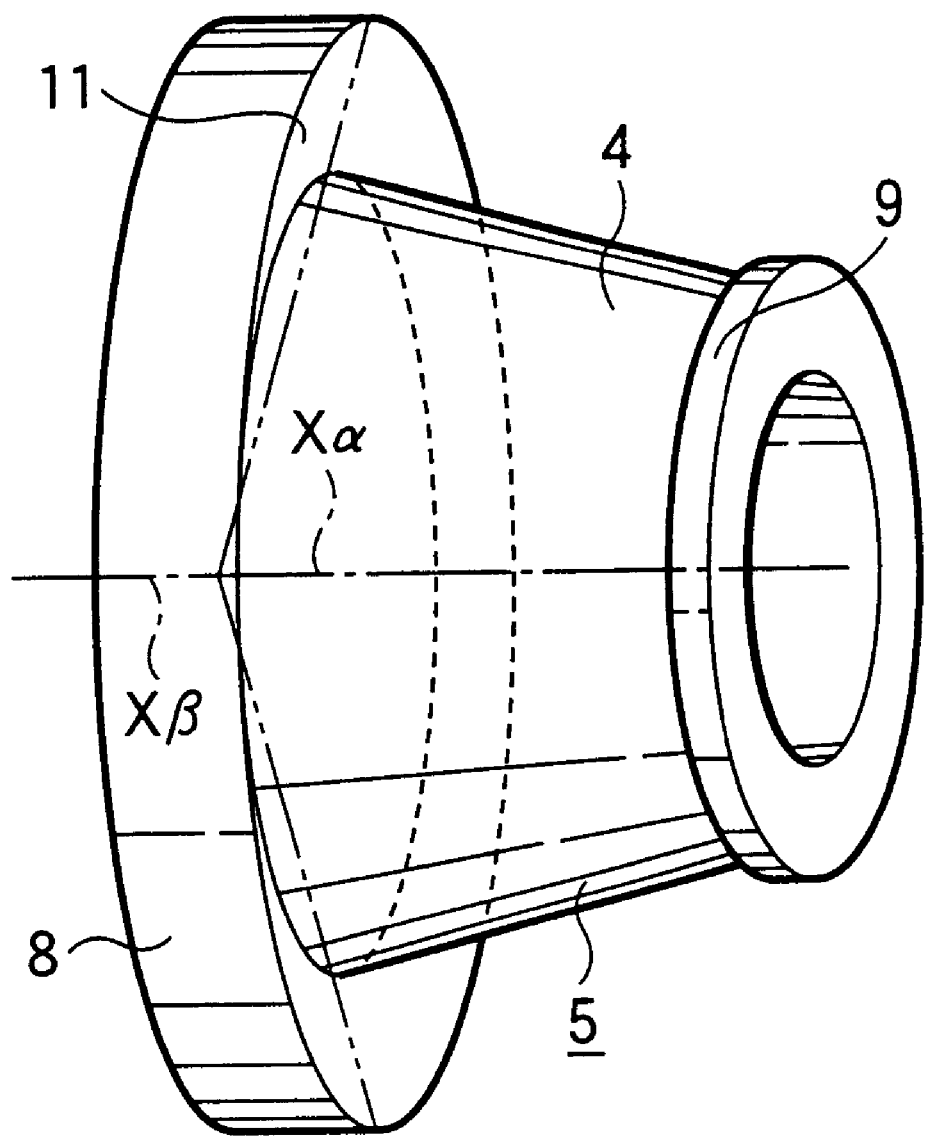
FIG. 4 a perspective view of an inner ring used in the tapered roller bearing, explaining an axial deflection 8 occurring on the inner surface of a large-diameter-side flange portion formed on the outer peripheral surface of the inner ring.

Now, torque is obtained in a state that a tapered roller bearing 1 (which is hereinafter referred to as a bearing A)

having a structure as shown in FIG. 2 under the following operating conditions. Referring in detail to this structure, the inside diameter R of the bearing 1 is 70 mm, the outside diameter D thereof is 150 mm, the width B thereof is 38 mm, the pitch circle diameter dm thereof is 99 mm, the cone angle 2β thereof (refer FIG. 2) is 8.5°, the diameter $d_6$ of the head portion 10 of the tapered roller 6 is 21.5 mm, the axial-direction length L of the tapered roller 6 is 24 mm, the number of the tapered rollers 6 is 13, and the flange angle θf, that is, the inclination angle of the inner surface 11 of the large-diameter-side flange portion 8 formed on the large-diameter-side end portion outer peripheral surface of the inner ring 5 with respect to a virtual plane crossing at right angles to the axis of the inner ring 5 is 20°. Also, the above-mentioned operating conditions are as follows: that is, the rotation speed is 6000 min$^{-1}$, the thrust load is 11000N, the lubricating oil used is lubricating oil having dynamic viscosity of 180 cSt at a temperature of 40° C., the PV value of the contact portion is 600 MPa·m/s, the temperature of the bearing is 60° C., and the thickness h of the oil film is 0.068 μm.

Under these operating conditions, of various kinds of torque required in the tapered roller bearing 1 having the above specifications, the value Ms of the torque caused by friction between the inner surface 11 of the large-diameter-side flange portion and the head portion 10 which is the large-diameter-side end face of each of the tapered rollers 6 is calculated according to the following expression (1).

$$Ms = e \cdot \mu \cos \beta \cdot Fa \cdot exp(-1.8 \Lambda^{1.2}) \quad (1)$$

By the way, in this expression (1), e expresses the contact position of the head portion 10 of each tapered roller 6, μ expresses a coefficient of friction, β expresses 1/2 of the cone angle of each tapered roller 6, Fa expresses an axial load, and Λ=h/σ (h expresses the thickness of the oil film between the flange portion and tapered roller, and a expresses flange/roller composite roughness). Referring to the details of the oil film parameter Λ, they are set forth in, for example, pp. 177–179 of [Rolling Bearing Technology] edited by the rolling bearing technology editorial committee and published in 1975 by Yoken-do. Also, the above expression (1) is disclosed in [NSK TECHNICAL JOURNAL 649 "Rolling Bearing Friction and EHL Rolling Viscous Resistance"] and is thus conventionally known.

In case where, of various kinds of torque which, when the tapered roller bearing 1 is rotated, are caused as resistance with respect to the rotation, the torque caused by friction between the head portion 10 of each tapered roller 6 and the inner surface 11 is converted to calorific power generated in each tapered roller 6 (per tapered roller), there is obtained about 70 W. The thus obtained value of 70 W (calorific power per tapered roller) is a value according to the above-mentioned expression (1) which is the formulated expression of the calorific power obtained when the tapered roller bearing 1 having the above-mentioned specifications is operated under the above-mentioned operating conditions; and, the above-mentioned axial deflection δ is not considered in this value (the axial deflection δ=0). Also, as for the oil film parameter Λ, based on the oil film thickness h (=0.068 μm) and flange/roller composite roughness σ, it is set such that Λ=0.45.

Figure 5:
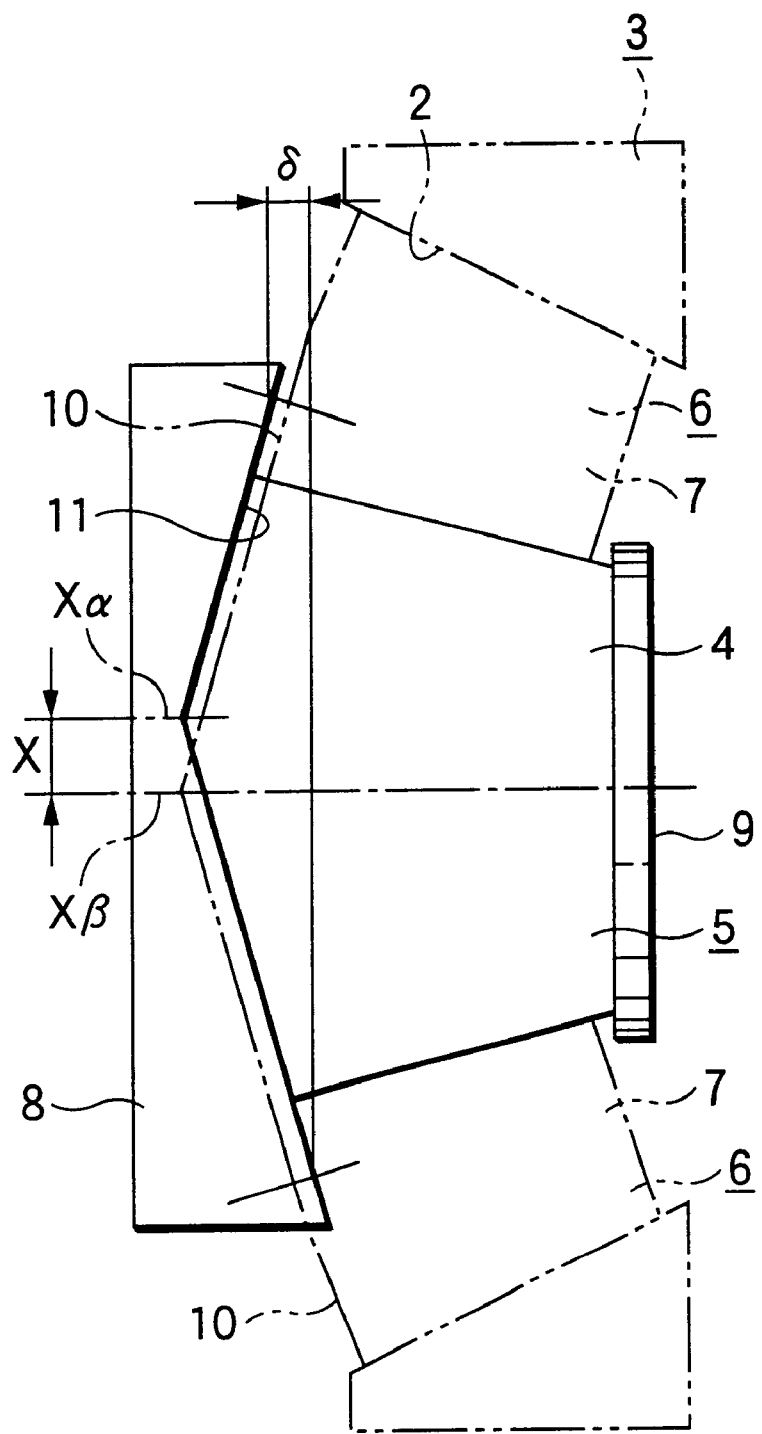
FIG. 5 is a typical view of the inner ring when it is viewed from the outside diameter side thereof.

Next, description will be given below of a case where the axial deflection δ is present. As can be clearly understood from the above-described description relating to FIG. 5, the surface pressure in the contact portion between the inner surface 11 of the large-diameter-side flange portion 8 and the head portion 10 of the tapered roller 6 rises on the side where the inner surface 11 is deflected (on the top portion side) and lowers on the opposite side (on the bottom portion side). And, the intensity of the mutual contact between the inner surface 11 and head portion 10, that is, the difference between the surface pressure in the top portion and the surface pressure in the bottom portion increases in proportion to the axial deflection δ. With respect to such surface pressure difference, the tapered rollers 6 are each checked: specifically, for the strongest-contact combination of the flange portion/tapered roller (that is, a combination of the flange portion and tapered roller that is situated in the top portion among the thirteen tapered rollers and provides the highest surface pressure) as well as the weakest-contact combination of the flange portion/tapered roller (that is, a combination of the flange portion and the tapered roller that is situated in the bottom portion among the thirteen tapered rollers and provides the lowest surface pressure), the values of their respective surface pressures are found according to the balance of forces. A force acting on the head portion 10 of the tapered roller 6 is found according to the (4-6) expression and (4-7) expression that are respectively stated in the above-cited [Rolling Bearing Technology], p. 83. Also, a force q acting on the raceway surfaces (of the outer ring raceway 2 and inner ring raceway 4) can be calculated according to the following expression (2) which, even in case where the tapered roller 6 is tilted or crowned, allows calculation of the force q by dividing the tapered roller 6 in the longitudinal direction thereof. This expression (2) is stated in the [ROLLING BEARING ANALYSIS], Third Edition, p. 235, as a (6.112) expression.

$$q = \frac{\delta_e^{1.11} \times 10^{-3}}{1.24 \times 10^{-5}(kw)^{0.11}} \quad (2)$$

By the way, in the expression (2), the unit of q is N, while kw expresses the length [mm] of the tapered roller (which corresponds to L shown in FIG. 2). Also, k expresses the number of the divided portions of the tapered roller and w expresses the unit length of the divided portions. Further, $\delta_e$ expresses the quantity of mutual approach between the inner and outer rings and the unit of $\delta_e$ is μm.

Figure 10:
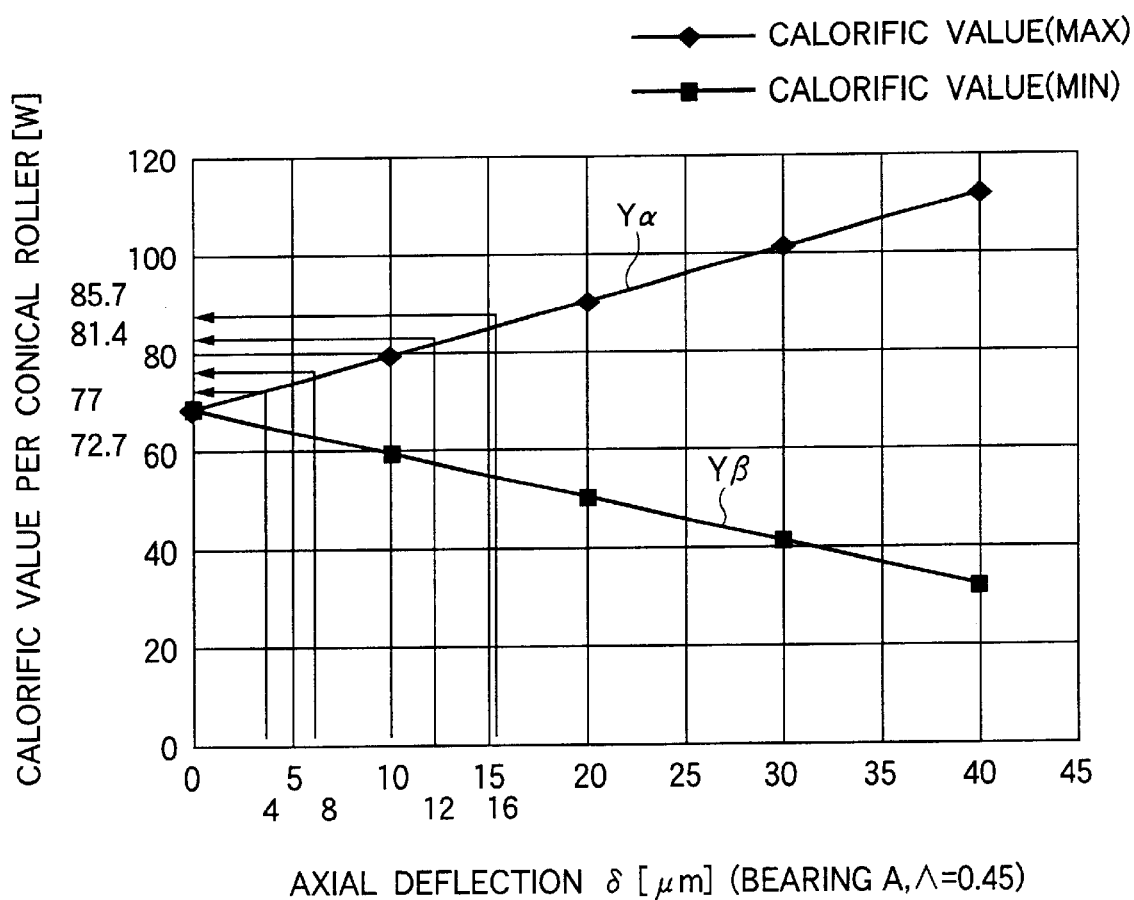
FIG. 10 is a diagrammatic view of the results that are obtained by checking the relation between the axial deflection and calorific value in the case of a tapered roller bearing having a first type of specifications according to a second aspect of the invention at the time of completion thereof.

By taking into consideration the variations in the force due to the axial deflection δ in the above-mentioned manner, similarly to the before-mentioned case using the expression (1), for each of the tapered rollers 6, the calorific value as well as the relation between the axial deflection δ and calorific value can be found respectively. The thus-obtained relation between the axial deflection δ and calorific value is shown in FIG. 10. Of two lines shown in FIG. 10, an upper line Yα represents the relation between the axial deflection a and calorific value with respect to the tapered roller 6 that is situated in the highest top portion and provides the highest surface pressure, while a lower line Yβ represents the relation between the axial deflection δ and calorific value with respect to the tapered roller 6 situated in the lowest top portion and providing the lowest surface pressure. By the way, since each tapered roller 6 moves through the above-mentioned top and bottom portions as it moves along the raceway surfaces of the inner and outer rings of the bearing 1, the calorific value of each combination of the flange/tapered roller (per instant) provides the value that is present between the two lines Yα and Yβ including these two lines. However, whether seizure or scuffing occurs or not depends on the largest value (that is, the longitudinal axis position of the upper line Yα) in this range. Therefore, the condition to be able to prevent occurrence of the seizure or scuffing can be decided using the upper line Yα.

From this viewpoint, with respect to the upper line Yα shown in FIG. 10, the values of the axial deflection δ, that is, 8 μm, 12 μm, and 16 μm are checked based on the test the results of which are shown in the above-described FIGS. 7 to 9, The calorific values of the flange/tapered roller combination per tapered roller 6 corresponding to the three values of the axial deflection δ are 77 W, 81.4 W and 85.7 W, respectively. On the other hand, since the values of the flange/tapered roller composite roughness σ to be secured for prevention of seizure in these cases, similarly to the before-mentioned cases (1), (2), and (3), are 0.22 μmRMS, 0.18 μmRMS, and 0.13 μmRMS respectively, with respect to these composite roughness σ values, the calorific values of the flange/tapered roller combination per tapered roller, that is, 77 W, 81.4 W and 85.7 W are threshold values; and, therefore, in case where the calorific values of the flange/tapered roller per tapered roller become equal to or larger than these values, it is judged that the tapered roller bearing 1 can seize. By the way, in the case of the value of the flange/tapered roller composite roughness σ of 0.16 μmRMS corresponding to the value, 8 μm of the axial deflection δ shown as the preferable range in the before-mentioned case (4), the calorific value of the flange/tapered roller combination is 77 W. Also, in the case of the value of the flange/roller composite roughness σ of 0.16 μmRMS corresponding to the value, 4 μm of the axial deflection δ shown as the more preferable range in the before-mentioned case (5), the calorific value of the flange/tapered roller combination is 72.7 W.

Figure 11:
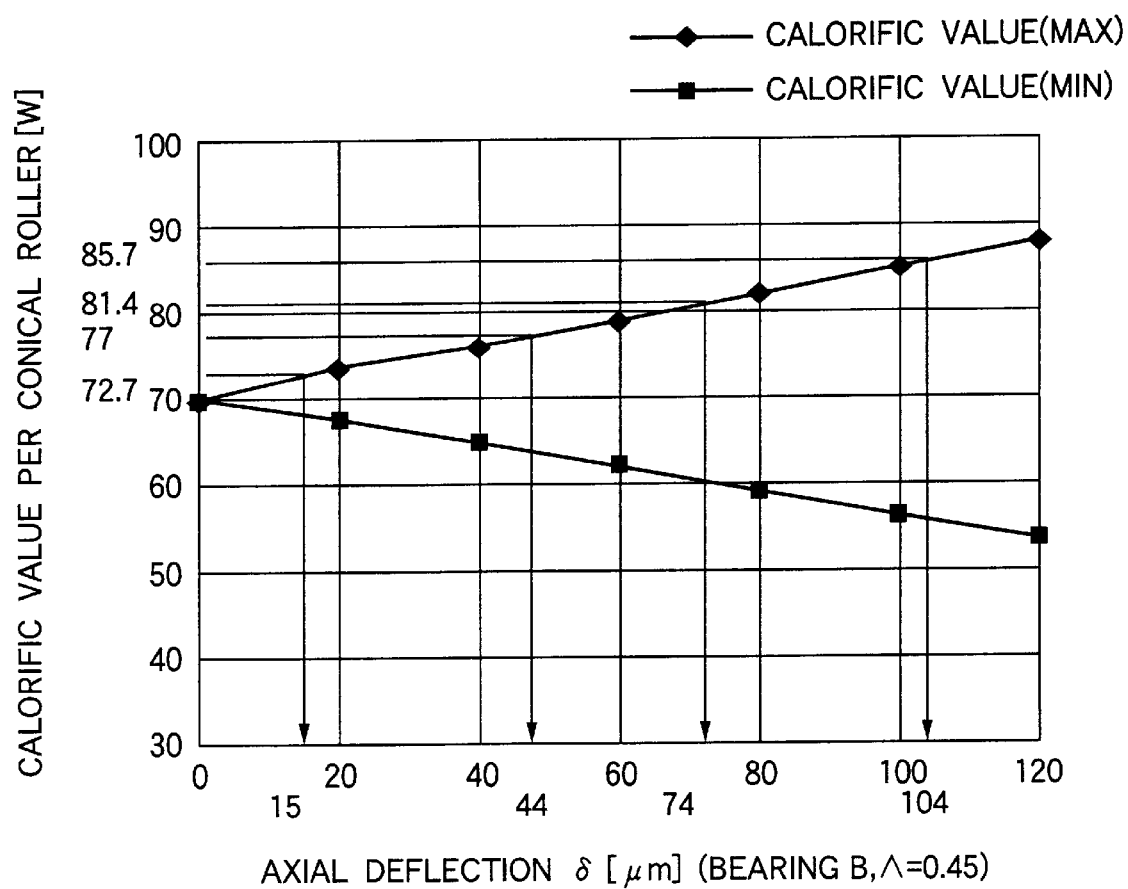
FIG. 11 is a diagrammatic view of the results that are obtained by checking the relation between the axial deflection and calorific value in the case of a tapered roller bearing having a second type of specifications according to the second aspect of the invention.
Figure 12:
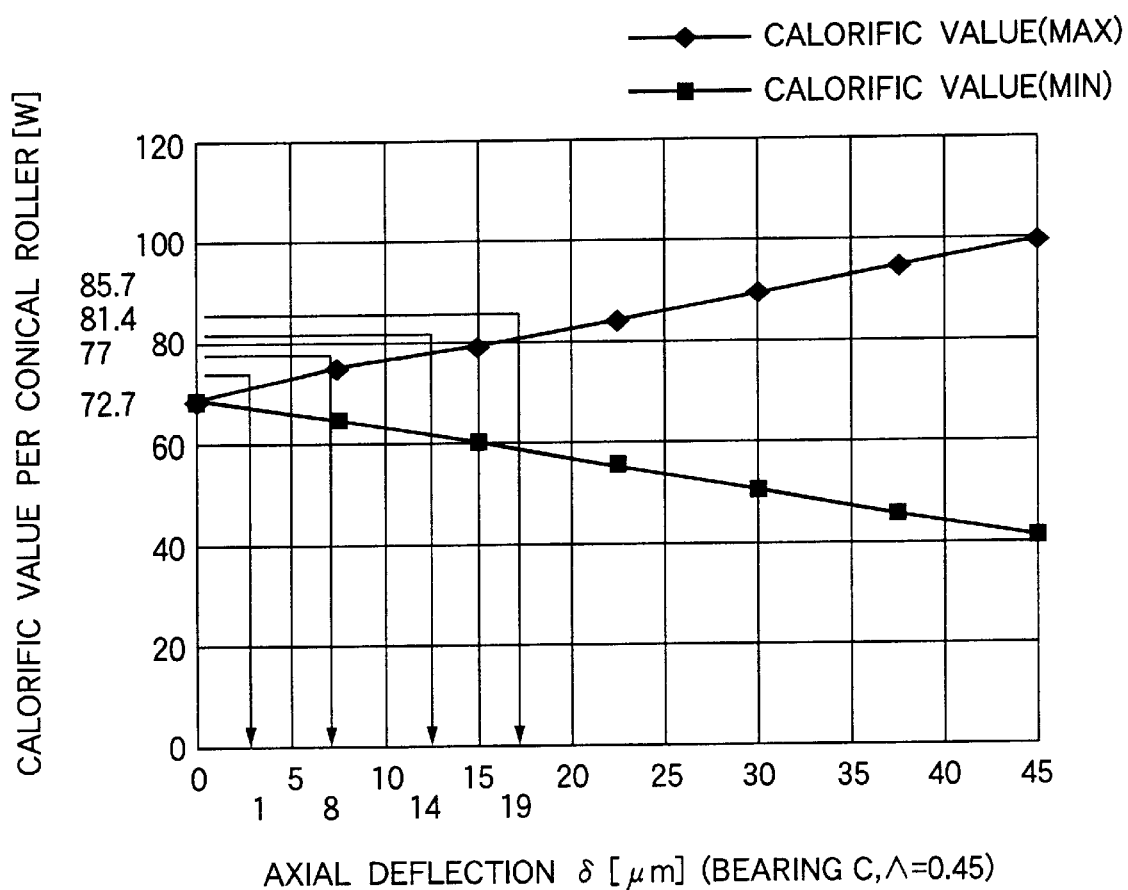
FIG. 12 is a diagrammatic view of the results that are obtained by checking the relation between the axial deflection and calorific value in the case of a tapered roller bearing having a third type of specifications according to the second aspect of the invention.
Figure 13:
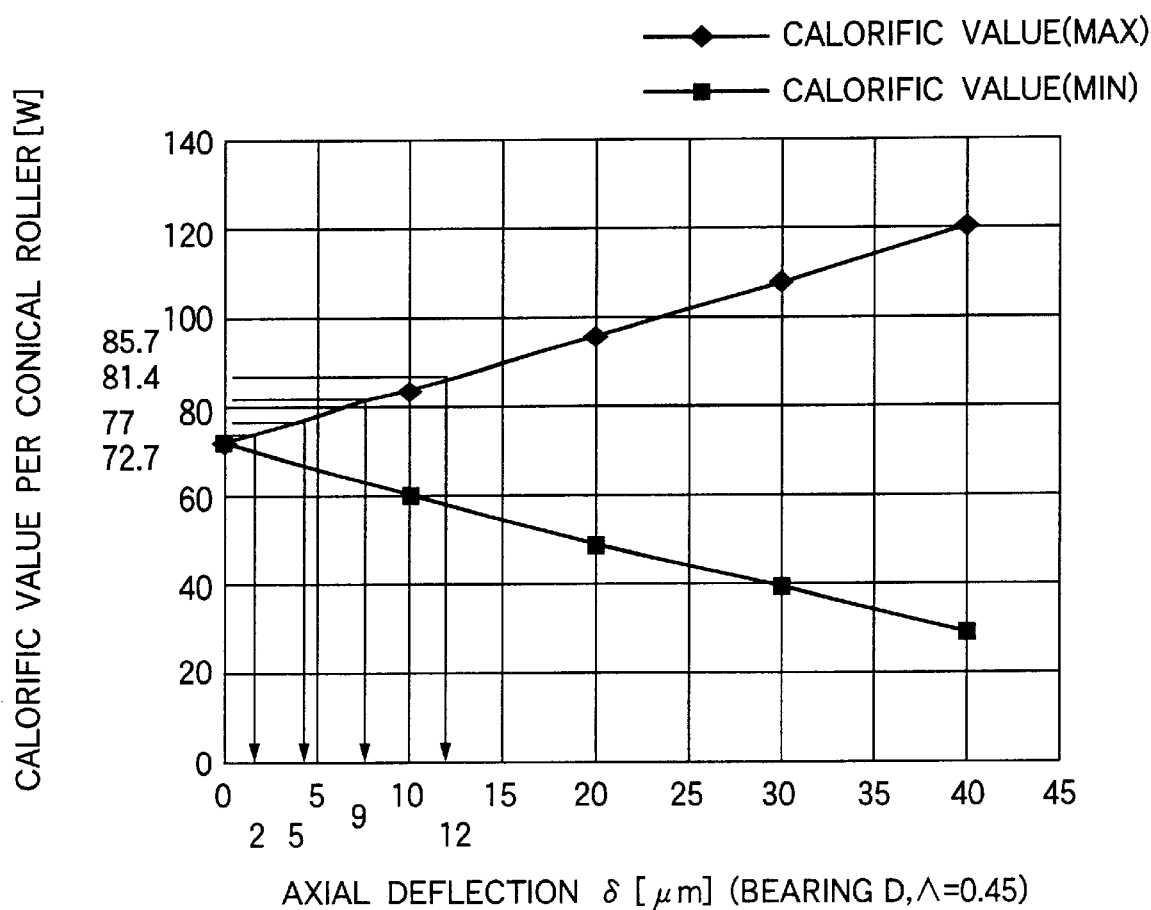
FIG. 13 is a diagrammatic view of the results that are obtained by checking the relation between the axial deflection and calorific value in the case of a tapered roller bearing having a fourth type of specifications according to the second aspect of the invention.

The above-mentioned analysis method is applied to other three kinds of tapered roller bearings (bearings B, C and D) differing in size from each other to hereby confirm that the bearings can be prevented against seizure by controlling the calorific values thereof. Firstly, in the above-mentioned three kinds of tapered roller bearings, in the case of no axial deflection (δ=0), the operating conditions were set (the conditions were obtained according to the surface pressures and sliding speeds thereof) in such a manner that the calorific value per tapered roller is equal to that of the bearing A having the beforementioned specifications. And, with respect to these three kinds of sizedifferent tapered roller bearings, similarly to the case in which the above-mentioned FIG. 10, the relation between the axial deflection δ and the calorific value of the flange/tapered roller combination was obtained in case where the axial deflection δ is increased. The results of this test are shown in FIGS. 11 to 13. And, in accordance with these FIGS. 11 to 13, there were obtained the values of the axial deflection α at the time when the maximum calorific value of the flange/tapered roller combination is equal to the above-mentioned threshold values, that is, 77 W, 81.4 W and 85.7 W that can prevent the bearings against seizure. Further, from the above FIGS. 11 to 13, there were obtained the preferable value of the axial deflection 8 that corresponds to the calorific value of the flange/tapered roller combination, that is, 77W and the more. preferable value of the axial deflection δ that corresponds to the calorific value of the flange/tapered roller combination, that is, 72.7 W.

Of these FIGS. 11 to 13, firstly, FIG. 11 represents the calculated results of the tapered roller bearing 1 (bearing B) in which an inside diameter R is 200 mm, an outside diameter D is 280 mm, a width B is 51 mm, a pitch circle diameter dm is 240 mm, a cone angle 2β (see FIG. 2) is 2°, the diameter $d_6$ of the head portion 10 of a tapered roller 6 is 19.2 mm, the axial-direction length L of the tapered roller 6 is 35 mm, the number of tapered rollers 6 is 32, and the inclination angle, that is, flange angle θ f of the inner surface 11 of a large-diameter-side flange portion 8 formed on the large-diameter-side end portion outer peripheral surface of an inner ring 5 with respect to a virtual plane extending at right angles to the center axis of the inner ring 5 is 12°. In this case, in the case of no axial deflection (δ=0), the operating conditions for the calorific value of approx. 70 W are as follows: that is, the rotation speed is 2400 $\text{min}^{-1}$, the thrust load is 695600 N, the dynamic viscosity of lubricating oil used at the temperature of 50° C. is $1.08\times10^{-4}$ m²/S (108 cSt), the PV value of the contact portion is 290 MPa·m/s, the bearing temperature is 60° C., and the oil film thickness h is 0.066 μm.

And, in case where the axial deflection 5 is increased with the operating conditions unchanged, there can be obtained calorific values which are shown by two lines in FIG. 11. In this case, when the oil film parameter Λ is equal, whether seizure or scuffing occurs in the contact portion between the inner surface 11 of the large-diameter-side flange portion 8 and the head portion 10 of the tapered roller 6 or not depends on the calorific value of the partial flange/tapered roller combination portion regardless of the dimensions of the bearing. Therefore, since the values of the axial deflection δ when they are equal to the above-mentioned threshold values 77 W, 81.4 W and 85.7 W provide their limit values (that is, the threshold values relating to the axial deflection δ)), as the threshold values relating to the axial deflection δ, there can be obtained 44 μm, 74 μm, and 104 μm, respectively, from the upper line shown in FIG. 11. Also, the threshold value of the axial deflection δ, corresponding to the calorific value 77 W of the flange/tapered roller combination which is shown as the preferable range is 44 μm; and, the threshold value of the axial deflection δ, corresponding to the calorific value 72.7 W of the flange/tapered roller combination which is shown as the preferable range is 15 μm.

Next, FIG. 12 represents the calculated results of the tapered roller bearing 1 (bearing C) in which an inside diameter R is 30 mm, an outside diameter D is 72 mm, a width B is 20.75 mm, a pitch circle diameter dm is 51 mm, a cone angle 2β (see FIG. 2) is 7°, the diameter $d_6$ of the head portion 10 of a tapered roller 6 is 11.7 mm, the axial-direction length L of the tapered roller 6 is 13 mm, the number of tapered rollers 6 is 13, and the inclination angle, that is, flange angle θf of the inner surface 11 of a large-diameter-side flange portion 8 formed on the large-diameter-side end portion outer peripheral surface of an inner ring 5 with respect to a virtual plane extending at right angles to the center axis of the inner ring 5 is 13°. In this case, in the case of no axial deflection (δ=0), the operating conditions for the calorific value of approx. 70 W are as follows: that is, the rotation speed is 12100 $\text{min}^{-1}$, the thrust load is 11760 N, the dynamic viscosity of lubricating oil used at the temperature of 50° C. is $1.08\times10^{-4}$ m²/S (108 cSt), the PV value of the contact portion is 900 MPa·m/s, the bearing temperature is 60° C., and the oil film thickness h is 0.067 μm.

And, in case where the axial deflection δ is increased with the operating conditions unchanged, there can be obtained calorific values which are shown by two lines in FIG. 12. In this case as well, when the oil film parameter Λ is equal, whether seizure or scuffing occurs in the contact portion between the inner surface 11 of the large-diameter-side flange portion 8 and the head portion 10 of the tapered roller 6 or not depends on the calorific value of the partial flange/tapered roller combination portion regardless of the dimensions of the bearing. Therefore, since the values of the axial deflection δ when they are equal to the above-mentioned threshold values 77 W, 81.4 W and 85.7 W provide their limit values (that is, the threshold values relating to the axial deflection δ)), as the threshold values relating to the axial deflection δ, there can be obtained 8 μm, 14 μm, and 19 μm, respectively, from the upper line shown in FIG. 12. Also, the threshold value of the axial deflection δ, corresponding to the calorific value 77 W of the flange/tapered roller combination which is shown as the preferable range is 8 μm; and, the threshold value of the axial deflection δ, corresponding to the calorific value 72.7 W of the flange/tapered roller combination which is shown as the preferable range is 1 μm.

Further, FIG. 13 represents the calculated results of the tapered roller bearing 1 (bearing D) in which an inside diameter R is 28 mm, an outside diameter D is 72 mm, a width B is 27 mm, a pitch circle diameter dm is 50 mm, a cone angle 2β (see FIG. 2) is 10°, the diameter $d_6$ of the head portion 10 of a tapered roller 6 is 12.4 mm, the axial-direction length L of the tapered roller 6 is 14 mm, the number of tapered rollers 6 is 11, and the inclination angle, that is, flange angle θf of the inner surface 11 of a large-diameter-side flange portion 8 formed on the large-diameter-side end portion outer peripheral surface of an inner ring 5 with respect to a virtual plane extending at right angles to the center axis of the inner ring 5 is 18°. In this case, in the case of no axial deflection (δ=0), the operating conditions for the calorific value of approx. 70 W are as follows: that is, the rotation seed is 13200 $min^{-1}$, the thrust load is 9200 N, the dynamic viscosity of lubricating oil used at the temperature of 50° C. is $1.08 \times 10^{-4}$ $m^2/S$ (108 cSt), the PV value of the contact portion is 1090 MPa·m/s, the bearing temperature is 60° C., and the oil film thickness h is 0.068 μm.

And, in case where the axial deflection δ is increased with the operating conditions unchanged, there can be obtained calorific values which are shown by two lines in FIG. 13. In this case as well, when the oil film parameter Λ is equal, whether seizure or scuffing occurs in the contact portion between the inner surface 11 of the large-diameter-side flange portion 8 and the head portion 10 of the tapered roller 6 or not depends on the calorific value of the partial flange/tapered roller combination portion regardless of the dimensions of the bearing. Therefore, since the values of the axial deflection δ when they are equal to the above-mentioned threshold values 77 W, 81.4 W and 85.7 W provide their limit values (that is, the threshold values relating to the axial deflection δ)), as the threshold values relating to the axial deflection δ, there can be obtained 5 μm, 9 μm, and 12 μm, respectively, from the upper line shown in FIG. 13. Also, the threshold value of the axial deflection δ, corresponding to the calorific value 77 W of the flange/tapered roller combination which is shown as the preferable range is 5 μm; and, the threshold value of the axial deflection δ, corresponding to the calorific value 72.7 W of the flange/tapered roller combination which is shown as the preferable range is 2 μm.

Thus, from the results of calculation executed while changing the specifications of the tapered roller bearing 1 in the above-mentioned manner and shown in FIGS. 10 to 13, with respect to the threshold calorific values, there can be found the following facts.

That is:
(1) As the bearing dimension represented by the pitch circle diameter dm increases, the limit value of the axial deflection δ increases;
(2) As the cone angle 2β of the tapered roller 6 increases, the limit value of the axial deflection δ decreases; and,
(3) As the axial-direction length L of the tapered roller 6 increases, the limit value of the axial deflection δ decreases.

Also, the contact state of the contact portion between the inner surface 11 of the large-diameter-side flange portion 8 and the head portion 10 of the tapered roller 6 acts on the axial deflection δ in the generating line direction of the present tapered roller 6. Therefore, the intensity of the axial deflection δ acting on the above contact portion (that is, the intensity thereof applied to the pressure surface) varies according to the flange angle θf of the inner surface of the large-diameter-side flange portion 8 and is expressed as δ·cos θf.

In case where various parameters were combined together and the relation between them was checked in accordance with the above facts, it has been found that $dm/\{\tan(2\beta)\cdot L\}$ is almost proportionate to δ·cos θf.

Figure 14:
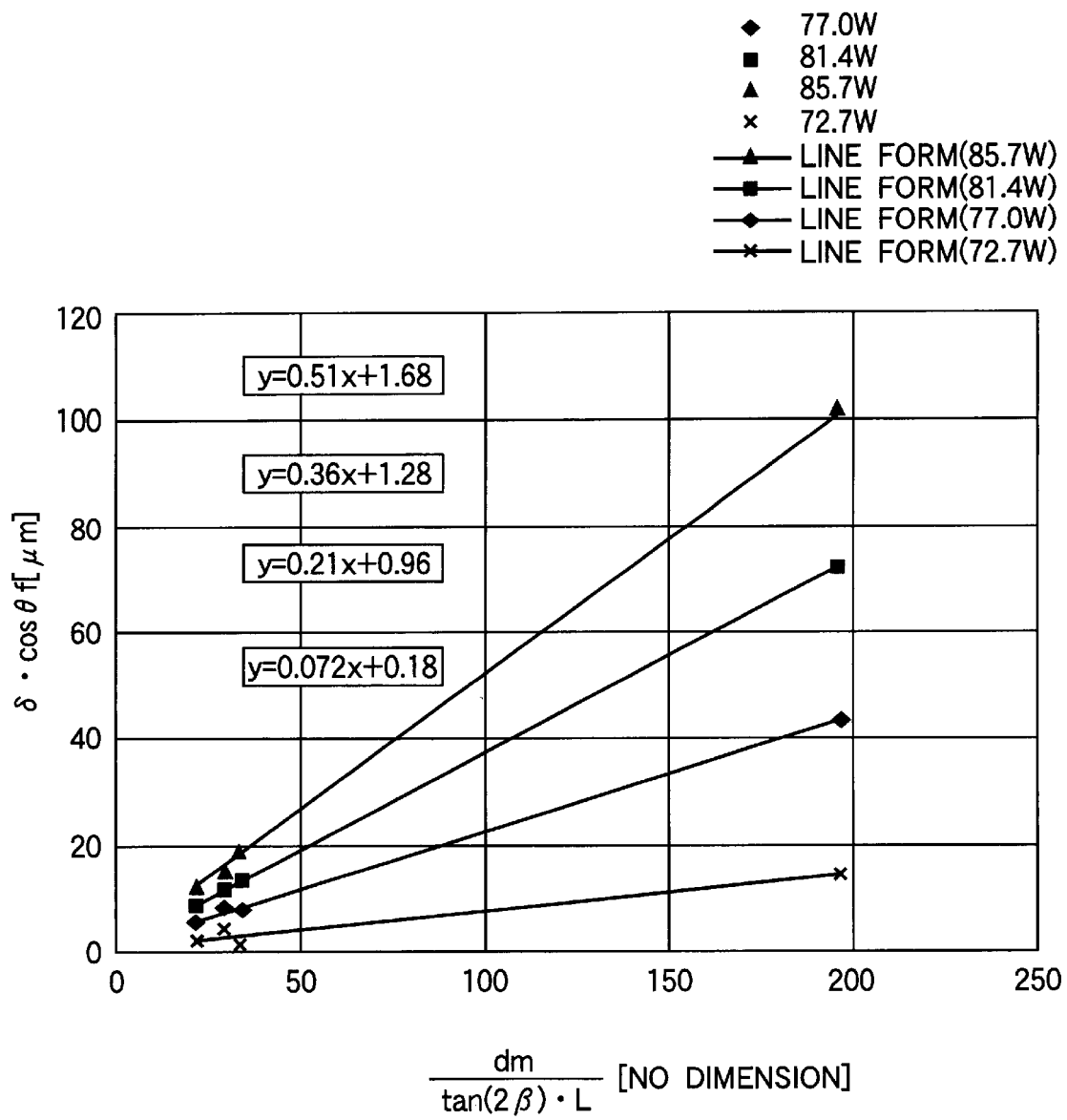
FIG. 14 is a diagrammatic view of the results that are obtained by checking the relation between dm/{tan(2β)·L} and δ·cos θf; and, FIG. 15 is a diagrammatic view of the results that are obtained by checking the relation between the pitch circle diameter and oil film thickness.

Now, FIG. 14 is a diagrammatic view in which, of the two values that have been found proportionate to each other, the value of $dm/\{\tan(2\beta)\cdot L\}$ is shown on the horizontal axis and the value of δ·cos θf (unit: μm) of its is shown on the vertical axis. Of four straight lines shown in FIG. 14, the upper three straight lines respectively correspond to the calorific values of the flange/tapered roller combination, 77 W, 81.4 W and 85.7 W as well as represent the relation between $dm/\{\tan(2\beta)\cdot L\}$ and δ·cos θf (unit: μm); and also, the three straight lines respectively correspond to the limit values (threshold values) of the axial deflection δ at which seizure or scuffing occurs in the bearing in case where the flange/roller composite roughness σ corresponds to 0.22 μmRMS (0.16 μmRMS), 0.18 μmRMS, and 0.13 μmRMS. Also, the remaining lower straight line corresponds to the calorific value of the flange/tapered roller combination, 72.7 W and also corresponds to the limit values of the axial deflection δ at which seizure or scuffing occurs in the bearing in case where the flange/roller composite roughness σ is 0.16 μmRMS.

In case where expressions for expressing the above straight lines are found according to the method of least squares, they can be obtained as follows: that is, (a) for the threshold value of the calorific value, 77 W (seizure limit value in the case of σ=0.22 μmRMS), $$\delta \cdot \cos \theta f = 0.21\ dm/\{\tan(2\beta)\cdot L\} + 0.96;$$

(b) for the threshold value of the calorific value, 81.4 W (seizure limit value in the case of σ=0.18 μmRMS), $$\delta \cdot \cos \theta f = 0.36\ dm/\{\tan(2\beta)\cdot L\} + 1.28;$$

(c) for the threshold value of the calorific value, 85.7 W (seizure limit value in the case of σ=0.13 μmRMS), $$\delta \cdot \cos \theta f = 0.51\ dm/\{\tan(2\beta)\cdot L\} + 1.68;$$

(d) for the threshold value of the calorific value, 77 W (preferable seizure limit value in the case of σ=0.16 μmRMS), $$\delta \cdot \cos \theta f = 0.21\ dm/\{\tan(2\beta)\cdot L\} + 0.96;$$

and, (e) for the threshold value of the calorific value, 72.7 W (more preferable seizure limit value in the case of σ=0.16 μmRMS), $$\delta \cdot \cos \theta f = 0.072\ dm/\{\tan(2\beta)\cdot L\} + 0.18.$$

By the way, in the above expressions (a) to (e), the units of dm and L are respectively mm, while the unit of δ is μm.

And, in case where the flange/roller composite roughness σ is set equal to or less than a given value as well as the axial deflection δ is controlled in such a manner that it goes below the straight lines respectively expressed by the above expressions (a) to (e), seizure or scuffing can be prevented.

To arrange the above facts properly, the value of the axial deflection δ that makes it possible to prevent seizure or scuffing can be expressed by the following conditional expressions (a) to (e). By the way, in the conditional expressions (a) to (e), the unit of δ is μm, while the units of dm and L are respectively mm. Also, the limit values of the roughness σ, as will be discussed later, vary according to the bearing sizes (dm) and, therefore, here, for convenience' sake, they are referred to as [roughness equivalent to—μmRMS].

(a)

$$\delta \leq \left\{0.21 \cdot \left(\frac{dm}{\tan(2\beta) \cdot L}\right) + 0.96\right\} \bigg/ \cos\theta f,$$

and roughness equivalent to σ≦0.22 μmRMS (b)

$$\delta \leq \left\{0.36 \cdot \left(\frac{dm}{\tan(2\beta) \cdot L}\right) + 1.28\right\} \bigg/ \cos\theta f,$$

and roughness equivalent to σ≦0.18 μmRMS (c)

$$\delta \leq \left\{0.51 \cdot \left(\frac{dm}{\tan(2\beta) \cdot L}\right) + 1.68\right\} \bigg/ \cos\theta f,$$

and roughness equivalent to σ≦0.13 μmRMS (d)

$$\delta \leq \left\{021 \cdot \left(\frac{dm}{\tan(2\beta) \cdot L}\right) + 0.96\right\} \bigg/ \cos\theta f,$$

and roughness equivalent to σ≦0.16 μmRMS.

(e)

$$\delta \leq \left\{0.072 \cdot \left(\frac{dm}{\tan(2\beta) \cdot L}\right) + 0.18\right\} \bigg/ \cos\theta f,$$

and roughness equivalent to σ≦0.16 μmRMS.

Figure 15:
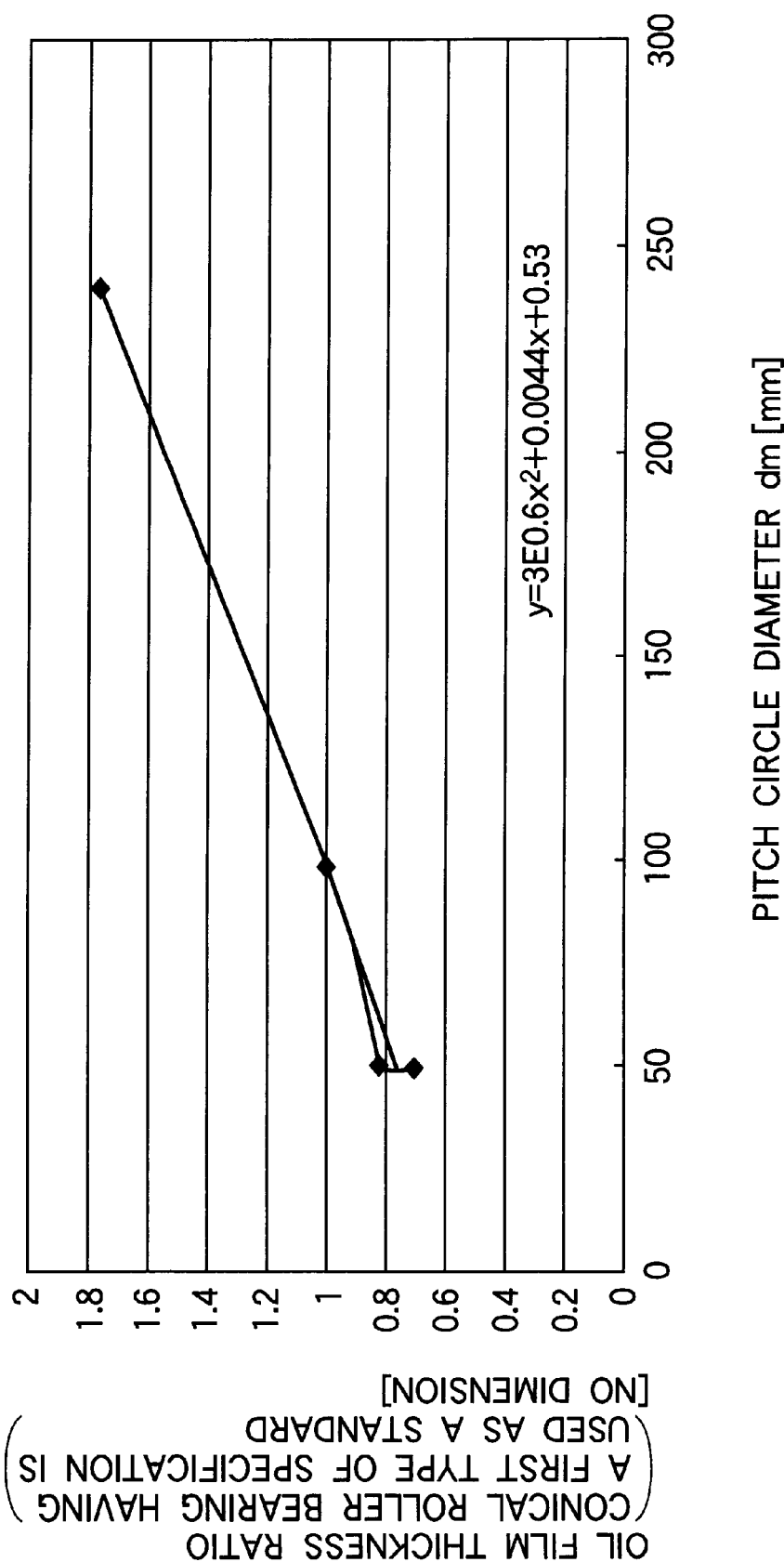

By the way, all of the above-mentioned five kinds of condition expressions (a)–(e) restrict the value of the axial deflection δ when the oil film parameter Λ is 0.45. On the other hand, the oil film parameter Λ is expressed by Λ=h/σ, using the oil film thickness h between the flange and tapered roller and the flange/tapered roller composite roughness σ. Thus, in case where the oil film thickness h varies while the oil film parameter Λ is equal, the allowed flange/tapered roller composite roughness σ varies. Therefore, for the four kinds of tapered roller bearings differing in the specifications from one another, the ratio between the pitch circle diameter dm and oil film thickness h was obtained with respect to the first tapered roller bearing (bearing A). The results of the thus obtained ratios are shown in FIG. 15. FIG. 15 shows, in the vertical axis thereof, the ratio between the pitch circle diameter dm and oil film thickness h as the value with respect to the first tapered roller bearing (bearing A) and, in the horizontal. axis thereof, the pitch circle diameter dm. As can be seen clearly from FIG. 15, as the pitch circle diameter dm increases, the oil film thickness h increases as well as the allowed flange/tapered roller composite roughness σ increases.

In case where the limit value of the allowed flange/tapered roller composite roughness σ is found as a value corresponding to the first tapered roller bearing (bearing A) from the results stated in FIG. 15, the above expressions (a)–(e) can be obtained in the following manner: that is, (a) in the case of the roughness equivalent to σ≦0.22 μmRMS, σ≦0.22×(3×10⁻⁶ dm²+0.0044 dm+0.53) μmRMS;

(b) in the case of the roughness equivalent to σ≦0.18 μmRMS,

σ≦0.18×(3×10⁻⁶ dm²+0.0044 dm+0.53) μmRMS;

(c) in the case of the roughness equivalent to σ≦0.13 μmRMS,

σ≦0.13×(3×10⁻⁶ dm²+0.0044 dm+0.53) μmRMS;

(d) and (e) in the case of the roughness equivalent to ≦0.16 μmRMS,

σ≦0.16×(3×10⁻⁶ dm²+0.0044 dm+0.53) μmRMS.

By the way, in the above expressions, the unit of dm is mm.

In case where the relation between the axial deflection δ and the flange/roller composite roughness σ is generalized by the results of the test conducted on the tapered roller bearing (bearing A) having the first specifications and the analysis of the results in accordance with the above-mentioned results, by controlling the axial deflection δ and the flange/roller composite roughness σ in such a manner that it can satisfy any one of the following relations (a) to (c), there can be obtained a tapered roller bearing having excellent seizure resistance and scuffing resistance. By the way, in the following expressions (a) to (c), the unit of δ is μm, while the units of dm and L are respectively mm.

$$\delta \leq \left\{0.21 \cdot \left(\frac{dm}{\tan(2\beta) \cdot L}\right) + 0.96\right\} \bigg/ \cos\theta f, \text{ and} \quad (a)$$

$$\sigma \leq 0.22 \times (3 \times 10^{-6} \text{ dm}^2 + 0.0044 \text{ dm} + 0.53) \ \mu mRMS;$$

$$\delta \leq \left\{0.36 \cdot \left(\frac{dm}{\tan(2\beta) \cdot L}\right) + 1.28\right\} \bigg/ \cos\theta f, \text{ and} \quad (b)$$

$$\sigma \leq 0.18 \times (3 \times 10^{-6} \text{ dm}^2 + 0.0044 \text{ dm} + 0.53) \ \mu mRMS;$$

$$\delta \leq \left\{0.51 \cdot \left(\frac{dm}{\tan(2\beta) \cdot L}\right) + 1.68\right\} \bigg/ \cos\theta f, \text{ and} \quad (c)$$

$$\sigma \leq 0.13 \times (3 \times 10^{-6} \text{ dm}^2 + 0.0044 \text{ dm} + 0.53) \mu mRMS.$$

Also, preferably, by controlling the axial deflection δ and the flange/roller composite roughness σ in such a manner that it can satisfy the following relation $$\delta \leq \left\{0.21 \cdot \left(\frac{dm}{\tan(2\beta) \cdot L}\right) + 0.96\right\} \bigg/ \cos\theta f, \text{ and} \quad (d)$$

$$\sigma \leq 0.16 \times (3 \times 10^{-6} \text{ dm}^2 + 0.0044 \text{ dm} + 0.53) \mu mRMS.$$

More preferably, by controlling the axial deflection δ and the flange/roller composite roughness σ in such a manner that it can satisfy the following relation $$\delta \leq \left\{ 0.072 \cdot \left( \frac{dm}{\tan(2\beta) \cdot L} \right) + 0.18 \right\} \bigg/ \cos\theta f, \text{ and} \quad (e)$$

$$\sigma \leq 0.16 \times (3 \times 10^{-6} \text{ dm}^2 + 0.0044 \text{ dm} + 0.53) \mu mRMS.$$

By the way, in the expressions (d) and (e) as well, the unit of $\delta$ is $\mu$m, while the units of dm and L are respectively mm.

Here, the above results are the calculated results in the case of the tapered roller bearing; that is, in the case of a cylindrical roller bearing (including a needle bearing), since the cone angle $2\beta$ of the roller is 0°, the above results cannot be applied as they are. However, in the case of the cylindrical roller bearing, since there has been established an analysis as a roller bearing which receives an axial load, calculation can be similarly made by applying the theory of the analysis (for example, see [Rolling Bearing Practical Handbook] edited by Esherman, translated by Tatsuo Yoshitake, supervised by Junzo Okamoto, and published by Industry Research Institute, 1996, pp. 182–184). Also, according to the invention, in the case of small- and medium-sized roller bearings having an inside diameter in the range of 20 to 200 mm, as described before, there can be obtained tapered roller bearings having excellent seizure resistance and scuffing resistance and also cylindrical roller bearings having excellent seizure resistance and scuffing resistance thereof, provided that the cylindrical roller bearings can satisfy any one of the following conditions: that is, $$\delta \leq 8 \ \mu m \text{ and } \sigma \leq 0.22 \ \mu mRMS; \quad (1)$$

$$\delta \leq 12 \ \mu m \text{ and } \sigma \leq 0.18 \ \mu mRMS; \quad (2)$$

and, $$\delta \leq 16 \ \mu m \text{ and } \sigma \leq 0.13 \ \mu mRMS. \quad (3)$$

Since a roller bearing according to the invention is structured and operates in the above-mentioned manner, even under the inferior lubricating conditions, the time necessary for damage such as seizure to occur in the present roller bearing can be extended and thus various rotary support parts incorporating the present roller bearing therein can be enhanced in reliability and durability. Also, because there is eliminated the need to obtain extremely high working accuracy, an increase in the manufacturing cost of the roller bearing can be controlled or minimized.

What is claimed is:

1. A roller bearing comprising:
   an outer ring having an outer ring raceway formed on the inner peripheral surface thereof;
   an inner ring having an inner ring raceway formed on the outer peripheral surface thereof;
   a flange portion formed on at least one of an end portion of the inner peripheral surface of said outer ring and an end portion of the outer peripheral surface of said inner ring;
   a plurality of rollers each having an outer peripheral surface and an axial-direction end face, said outer peripheral surface serving as a rolling surface contactable with said outer ring raceway and said inner ring raceway, said axial-direction end face serving as a sliding contact surface slidingly contactable with an inner surface of the flange portion,
   wherein, where an axial-direction difference between the top and bottom portions of the circumferential-direction undulation of said inner surface of said flange portion is defined as an axial deflection $\delta$, a composite roughness $(\sigma_1^2+\sigma_2^2)^{1/2}$ consisting of the root-mean-square roughness $\sigma_1$ of said sliding contact surface and the root-mean-square roughness $\sigma_2$ of said inner surface of said flange portion is defined as a flange/roller composite roughness $\sigma$, said flange/roller composite roughness $\sigma$ and said axial deflection $\delta$ can satisfy at least one of following conditions (1), (2) and (3):

$$\delta \leq 8 \ \mu m \text{ and } \sigma \leq 0.22 \ \mu mRMS; \quad (1)$$

$$\delta \leq 12 \ \mu m \text{ and } \sigma \leq 0.18 \ \mu mRMS; \quad (2)$$

$$\delta \leq 16 \ \mu m \text{ and } \sigma \leq 0.13 \ \mu mRMS. \quad (3)$$

2. A roller bearing as set forth in claim 1, wherein said flange/roller composite roughness $\sigma$ and said axial deflection $\delta$ can satisfy a condition (4)

$$\delta \leq 8 \ \mu m \text{ and } \sigma \leq 0.16 \ \mu mRMS. \quad (4)$$

3. A roller bearing as set forth in claim 1, wherein said flange/roller composite roughness $\sigma$ and said axial deflection $\delta$ can satisfy a condition (5)

$$\delta \leq 4 \ \mu m \text{ and } \sigma \leq 0.16 \ \mu mRMS. \quad (5)$$

4. A tapered roller bearing comprising:
   an outer ring having a conical-concave-surface-shaped outer ring raceway formed on the inner peripheral surface thereof,
   an inner ring having a conical-convex-surface-shaped inner ring raceway formed on the outer peripheral surface thereof,
   a flange portion formed on at least one of the end portion inner peripheral surface of the outer ring and the end portion outer peripheral surface of the inner ring; and
   a plurality of tapered rollers each having an outer peripheral surface serving as a conical-convex-surface-shaped rolling surface contactable with the outer ring raceway and inner ring raceway and also having an axial-direction end face serving as a sliding contact surface slidingly contacted with the inner surface of the flange portion,
   wherein said outer ring raceway of said outer ring is a conical-concave-surface-shaped outer ring raceway, said rollers are a plurality of tapered rollers, and
   wherein, where
   (i) an axial-direction difference between the top and bottom portions of the circumferential-direction undulation of said inner surface of said flange portion is defined as axial deflection $\delta$,
   (ii) a composite roughness $(\sigma_1^2+\sigma_2^2)^{1/2}$ consisting of the root-mean-square roughness $\sigma_1$ of said sliding contact surface and the root-mean-square roughness $\sigma_2$ of said inner surface of said flange portion is defined as a flange/roller composite roughness $\sigma$,
   (iii) dm using mm as the unit thereof expresses the pitch circle diameter of said roller bearing,
   (iv) $\beta$ expresses 1/2 of the cone angle of each of said tapered rollers,
   (v) L using mm as the unit thereof expresses the axial-direction length of each of said tapered rollers, and
   (vi) $\theta f$ expresses the flange angle, that is, the inclination angle of said inner surface of said flange portion with respect to a virtual plane crossing at right angles to the center axes of said outer and inner rings,
   said flange/roller composite roughness $\sigma$ and said axial deflection $\delta$ can satisfy at least one of following conditions (a), (b) and (c):

$$\delta \leq \left\{0.21 \cdot \left(\frac{dm}{\tan(2\beta) \cdot L}\right) + 0.96\right\} \Big/ \cos\theta f, \text{ and} \qquad (a)$$

$$\sigma \leq 0.22 \times (3 \times 10^{-6} \text{ dm}^2 + 0.0044 \text{ dm} + 0.53) \, \mu mRMS;$$

$$\delta \leq \left\{0.36 \cdot \left(\frac{dm}{\tan(2\beta) \cdot L}\right) + 1.28\right\} \Big/ \cos\theta f, \text{ and} \qquad (b)$$

$$\sigma \leq 0.18 \times (3 \times 10^{-6} \text{ dm}^2 + 0.0044 \text{ dm} + 0.53) \, \mu mRMS;$$

$$\delta \leq \left\{0.51 \cdot \left(\frac{dm}{\tan(2\beta) \cdot L}\right) + 1.68\right\} \Big/ \cos\theta f, \text{ and} \qquad (c)$$

$$\sigma \leq 0.13 \times (3 \times 10^{-6} \text{ dm}^2 + 0.0044 \text{ dm} + 0.53) \, \mu mRMS.$$

5. A roller bearing as set forth in claim 4, wherein said flange/roller composite roughness σ and said axial deflection δ can satisfy a condition (d), $$\delta \leq \left\{0.21 \cdot \left(\frac{dm}{\tan(2\beta) \cdot L}\right) + 0.96\right\} \Big/ \cos\theta f, \text{ and} \qquad (d)$$

$$\sigma \leq 0.16 \times (3 \times 10^{-6} \text{ dm}^2 + 0.0044 \text{ dm} + 0.53) \, \mu mRMS.$$

6. A roller bearing as set forth in claim 4, wherein said flange/roller composite roughness σ and said axial deflection δ can satisfy a condition (e), $$\delta \leq \left\{0.072 \cdot \left(\frac{dm}{\tan(2\beta) \cdot L}\right) + 0.18\right\} \Big/ \cos\theta f, \text{ and} \qquad (e)$$

$$\sigma \leq 0.16 \times (3 \times 10^{-6} \text{ dm}^2 + 0.0044 \text{ dm} + 0.53) \, \mu mRMS.$$

* * * * *